United States Patent
Oka et al.

(10) Patent No.: US 6,652,040 B2
(45) Date of Patent: Nov. 25, 2003

(54) BRAKE FLUID PRESSURE GENERATING DEVICE

(75) Inventors: Hiroyuki Oka, Higashimatsuyama (JP); Yoshiyasu Takasaki, Higashimatsuyama (JP)

(73) Assignees: Bosch Automotive Systems Corporation, Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/993,505

(22) Filed: Nov. 27, 2001

(65) Prior Publication Data
US 2002/0067070 A1 Jun. 6, 2002

(30) Foreign Application Priority Data

Dec. 5, 2000 (JP) .......................................... 2000-369639

(51) Int. Cl.[7] ................................................ B60T 8/44
(52) U.S. Cl. ..................................... 303/114.1; 303/155
(58) Field of Search ................................ 303/9.62, 155, 303/114.1, 114.3, 113.3

(56) References Cited

U.S. PATENT DOCUMENTS

| | | | | |
|---|---|---|---|---|
| 5,015,044 A | * | 5/1991 | Kircher et al. | 303/114.1 |
| 5,152,587 A | * | 10/1992 | Volz | 303/114.3 |
| 5,531,509 A | * | 7/1996 | Kellner et al. | 303/114.1 |
| 6,439,674 B1 | * | 8/2002 | Niino | 303/152 |

* cited by examiner

Primary Examiner—Christopher P. Schwartz
Assistant Examiner—Melanie Torres
(74) Attorney, Agent, or Firm—Kaensaka & Takeuchi

(57) ABSTRACT

A brake fluid pressure generating device includes a first valve element connected to an input shaft, a first force device connected to the first valve element to provide a counter force relative to a force applied to the first valve, a second valve element situated adjacent to the first valve element, a power cylinder unit actuated by the first valve, a second force device situated between a power cylinder unit and the second valve element to move the second valve element, and a third force device connected to the second valve element to provide a counter force relative to a force applied to the second valve. A master cylinder is connected to the power piston to generate a master cylinder pressure to thereby output a regulated control valve output pressure. A desired stroke characteristic of the brake can be obtained.

5 Claims, 15 Drawing Sheets

BRAKE FLUID PRESSURE GENERATING DEVICE

BACKGROUND OF THE INVENTION

The present invention relates to a brake fluid pressure generating device which generates brake fluid pressure via a control valve in response to operation of a brake operating means such as a brake pedal and, more particularly, to a brake fluid pressure generating device which can prevent the operating stroke of the brake operating means from being varied even with variation in consumption of brake fluid by that brake fluid pressure control is conducted regardless of the operation of the brake operating means on a wheel cylinder side of the brake fluid pressure generating device.

For example, in a conventional brake system of an automobile, a brake fluid pressure generating device has been employed which boosts a pedaling force exerted on a brake pedal by fluid pressure into predetermined magnitude to develop large brake fluid pressure. The brake fluid pressure generating device functions to provide a large braking force from a small pedaling force exerted on the brake pedal, thereby securing the braking action and reducing the fatigue of a driver.

Such conventional brake fluid pressure generating device can be roughly classified into the following types: one employing a vacuum booster for boosting the pedaling force by negative pressure to actuate the master cylinder, one employing a hydraulic booster for boosting the pedaling force by fluid pressure to actuate the master cylinder, one used in a full-power brake system for directly supplying fluid pressure to wheel cylinders, and the other one employing a pneumatic booster or an electromagnetic booster for boosting the pedaling force by compressed air or electromagnetic force to actuate a master cylinder.

FIG. 13 is a schematic illustration of a brake system with a brake fluid pressure generating device employing a conventional vacuum booster and FIG. 14 is a schematic illustration of a brake system employing a conventional hydraulic booster. In the following description of the prior art and description of embodiments, terms such as "top", "bottom", "right-hand", "left-hand" describe and correspond to the top, the bottom, the right-hand, and the left-hand in the associated drawings, and terms "front" and "rear" correspond to the left and the right in the associated drawings.

In the brake system with the brake fluid pressure generating device employing the vacuum booster shown in FIG. 13, an input force $F_1$ is exerted to an input shaft 4 of the brake fluid pressure generating device 1 by depression of a brake pedal 3 as a brake operating means so that the input shaft 4 moves in the operative direction. Then, a first valve element 5a of a control valve 5 moves to the left so that an output port 5c of the first valve element 5a is isolated from a low-pressure (L) valve passage $5b_1$ of a second valve element 5b connected to a negative pressure source and is connected to a high-pressure (H) valve passage $5b_2$ of the second valve element 5b connected to the atmospheric air. The atmospheric air is controlled according to the input $F_1$ by the control valve 5 to develop control valve output pressure $P_r$. The control valve output pressure $P_r$ is supplied to a power chamber 15b of the power cylinder unit 15 so that a power piston 15a moves to the left to produce output $F_p$ which is a boosted pedaling force. A master cylinder piston 16a is actuated by the output $F_p$ so that a master cylinder 16 generates master cylinder pressure $P_m$ which is supplied to wheel cylinder(s) 9 as braking fluid pressure $P_b$, thereby actuating the brake. A reaction force $F_m$ from the master cylinder 16 is modulated as a reaction force $F_v$ by a reaction mechanism 57 and is applied to the first valve element 5a. Therefore, the control valve output pressure $P_r$ of the control valve 5 is regulated to balance the reaction force $F_v$ with the input force $F_1$ of the input shaft 4. The reaction force $F_v$ is transmitted to a driver through the input shaft 4 and the brake pedal 3. In the vacuum booster, the first valve element 5a moves together with the input shaft 4 and the second valve element 5b moves together with the power piston 15a.

In the break system with the brake fluid pressure generating device employing the hydraulic booster shown in FIG. 14, an input force $F_1$ is exerted to an input shaft 4 by depression of a brake pedal 3 so that the input shaft 4 moves in the operative direction. Then, a first valve element 5a of a control valve 5 moves to the left so that an output port 5c of the first valve element 5a is isolated from a low-pressure (L) valve passage $5b_1$ of a second valve element 5b connected to a reservoir and is connected to a high-pressure (H) valve passage $5b_2$ of the second valve element 5b connected to a fluid pressure source. The hydraulic pressure of the fluid pressure source such as a pump and an accumulator is controlled according to the input $F_1$ by the control valve 5 to generate control valve output pressure $P_r$. The control valve output pressure $P_r$ is supplied to a power chamber 15b of the power cylinder unit 15 so that a power piston 15a moves to the left to produce output $F_p$ which is a boosted pedaling force. A master cylinder piston 16a is actuated by the output $F_p$ so that a master cylinder 16 generates master cylinder pressure $P_m$ which is supplied to wheel cylinder(s) 9 as braking fluid pressure $P_b$, thereby actuating the brake. A reaction force $F_m$ from the master cylinder 16 and a reaction force by the control valve output pressure $P_r$ of the control valve 5 are modulated as a reaction force $F_v$ by a reaction mechanism 57 and is applied to the first valve element 5a. Therefore, the control valve output pressure $P_r$ of the control valve 5 is regulated to balance the reaction force $F_v$ with the input force $F_1$ of the input shaft 4. The reaction force $F_v$ is transmitted to a driver through the input shaft 4 and the brake pedal 3. In the hydraulic booster, in the same manner as the vacuum booster, the first valve element 5a moves together with the input shaft 4 and the second valve element 5b moves together with the power piston 15a.

By the way, such conventional brake systems employ various brake controls such as for controlling the braking force during the braking action, for example, Brake Assist Control for increasing the braking force when the braking force is insufficient for emergency brake or the like, and Regenerative Brake Coordination Control to be performed when a regenerative brake system is used to generate braking pressure during the braking action by the service brake system, and Automatic Brake Controls, for example, a brake control for controlling the distance from a vehicle in front, a brake control for avoiding a collision with an obstacle object, and Traction Control (TRC).

Most of such brake controls are normally conducted in a brake circuit between the master cylinder 16 and the wheel cylinder(s) 9. However, when the brake control is conducted in the brake circuit after the master cylinder, it is required to prevent the pedal stroke of or pedaling force on the brake pedal 3 from being affected by such brake controls, for instance, for obtaining better operational feeling.

However, in the aforementioned conventional brake systems, the stroke of the master cylinder piston 16a is defined by the relation between the master cylinder 16 and the wheel cylinder(s) 9. Accordingly, the stroke of the input shaft 4 of the brake fluid pressure generating device 1, i.e.

the pedal stroke of the brake pedal 3, depends on the stroke of the master cylinder piston 16a. That is, the stroke for input is affected by the brake controls conducted in the brake circuit after the master cylinder 16. In the brake system employing the conventional brake fluid pressure generating device 1, it is hard to securely and sufficiently satisfy the aforementioned requirement.

If the input side and the output side are just separated from each other to produce outputs regardless of the stroke of the input side, the input side does not travel so that the stroke of the input side can not be ensured.

For this, a full power brake system has been conventionally proposed in which a stroke simulator is provided on the brake circuit after the master cylinder 16 to prevent the stroke of the input side from being affected by the brake control after the master cylinder and to ensure the stroke of the input side.

In this type of full power brake system shown in FIG. 15, an input force $F_1$ is exerted to an input shaft 4 by depression of a brake pedal 3 so that the input shaft 4 moves in the operative direction. Then, a first valve element 5a of a control valve 5 moves to the left so that an output port 5c of the first valve element 5a is isolated from a low-pressure (L) valve passage $5b_1$ of a second valve element 5b connected to a reservoir and is connected to a high-pressure (H) valve passage $5b_2$ of the second valve element 5b connected to a fluid pressure source. The hydraulic pressure of the fluid pressure source such as a pump and an accumulator is controlled according to the input $F_1$ by the control valve 5 to generate control valve output pressure $P_r$. The control valve output pressure $P_r$ is supplied to wheel cylinder(s) 9 as braking fluid pressure $P_b$, thereby actuating the brake.

At the same time, the control valve output pressure $P_r$ is also supplied to a power chamber 15b of the power cylinder unit 15 so that the power piston 15a moves to the left to produce output $F_p$. The master cylinder piston 16a is actuated by the output $F_p$ so that the master cylinder 16 generates master cylinder pressure $P_m$ which is supplied to the stroke simulator 58 whereby a piston of the stroke simulator 58 moves to the left, thereby ensuring the stroke of the input shaft 4, i.e. the stroke of the first valve element 5a. A reaction force $F_m$ from the master cylinder 16 and a reaction force by the control valve output pressure $P_r$ of the control valve 5 are modulated as a reaction force $F_v$ by a reaction mechanism 57 and is applied to the first valve element 5a. Therefore, the control valve output pressure $P_r$ of the control valve 5 is regulated to balance the reaction force $F_v$ with the input force $F_1$ of the input shaft 4. The reaction force $F_v$ is transmitted to a driver through the input shaft 4 and the brake pedal 3.

In the control valve 5 of the full power brake system, in the same manner as the vacuum or hydraulic booster, the first valve element 5a moves together with the input shaft 4 and the second valve element 5b moves together with the power piston 15a.

However, to prepare the additional stroke simulator 58, many parts (of which some parts are not shown) such as a stroke cylinder and an electromagnetic switching valve used for the stroke simulator 58 are required, making the structure complex and increasing the cost.

In a regenerative coordination brake system composed of a combination of a service brake system and a regenerative brake system, when the regenerative brake system is actuated during service braking by the operation of the brake fluid pressure generating device, the braking force produced by the brake fluid pressure generating device 1 should be reduced for the braking force produced by the regenerative brake system. In this case, it is desired to conduct the control of the brake fluid pressure on the wheel cylinder side.

In a brake system composed of a combination of a service brake system and a brake assist system, it is desired to increase the output of the brake fluid pressure generating device to intensify the braking force produced by the brake fluid pressure generating device in such case that brake assist operation is needed, for example, a case that a driver can not depress a brake pedal enough during the operation of the brake fluid pressure generating device 1 so as not to produce a predetermined braking force. In this case also, it is desired to conduct the control of the brake fluid pressure on the wheel cylinder side.

As mentioned above, since the consumption of brake fluid by the control of the braking pressure varies when the control of the braking pressure is conducted on the wheel cylinder side independently from the operation of the brake pedal during the service braking operation, the pedal stroke is affected in the conventional brake fluid pressure generating device 1. That is, in the conventional brake fluid pressure generating device 1, desired pedal stroke can not be obtained because it is affected by variation in consumption of the brake fluid.

SUMMARY OF THE INVENTION

It is an object of the present invention to provide a brake fluid pressure generating device which can provide a desired operation stroke characteristic of a brake operating means regardless of variation in consumption of brake fluid in a brake circuit.

To achieve the aforementioned objects, the present invention provides a brake fluid pressure generating device. A brake fluid pressure generating device comprises at least an input shaft which is actuated by input applied through the operation of a brake operating means, and a control valve which is operated by the input of said input shaft to regulate the pressure of a pressure source according to the operational input (operational stroke, operational force) of the said brake operating means to output regulated control valve output pressure, wherein said control valve has a first valve element and a second valve element which are movable relative to each other, said first valve element is subjected to the input of said input shaft and a first force relating to said input which counteract with each other, and said second valve element is subjected to a second force relating to said input and a second valve element converted force which is produced by converting the stroke of the second valve element by a first converting factor which counteract with each other, and said first valve element is controlled to balance said input and said first force and said second valve element is controlled to balance said second force and said second valve element converted force, whereby the control valve output pressure regulated according to the operational input of said brake operating means is generated.

The present invention is characterized in that said second force applied to said second valve element is a first control valve converted force which is produced by converting said control valve output pressure by a second converting factor, or a component of the force corresponding to the operational input of said brake operating means which is produced by distributing the force according to a first distribution factor.

The present invention is further characterized in that said first force applied to said first valve element is a first valve element converted force which is produced by converting the stroke of said first valve element by a third converting factor, or a second control valve converted force which is produced by converting said control valve output pressure by a forth converting factor.

Further, the present invention is characterized by further comprising a power cylinder unit in which said control valve output pressure is supplied and a power piston is moved by the supplied control valve output pressure so as to output, and a master cylinder which is actuated by the output of said power cylinder unit to generate master cylinder pressure, wherein said second force applied to said second valve element is a converted force which is produced by converting the stroke of said power piston by a fifth converting factor, a first control valve converted force which is produced by converting said control valve output pressure by a second converting factor, or a component of the force corresponding to the operational input of said brake operating means which is produced by distributing the force according to a first distribution factor.

Furthermore, the present invention is characterized in that said first force applied to said first valve element is a first valve element converted force which is produced by converting the stroke of said first valve element by a third converting factor, a second control valve converted force which is produced by converting said control valve output pressure by a forth converting factor, or a master cylinder converted force which is produced by converting said master cylinder pressure by a sixth converting factor.

Moreover, the present invention is characterized in that an assist biasing force for shifting said first valve element relative to said second valve element is applied between said first and second valve elements, wherein said first valve element is controlled to balance said input, said first force, and said assist biasing force, and said second valve element is controlled to balance said second force, said second valve element converted force, and said assist biasing force, whereby the control valve output pressure regulated according to the operational input of said brake operating means is generated.

In addition, the present invention is characterized in that said assist biasing force is an electromagnetic force by a solenoid coil.

The present invention is further characterized in that the input of said input shaft applied to said first valve element is a component of the force corresponding to the operational input of said brake operating means which is produced by distributing the force according to a second distribution factor.

In the brake fluid pressure generating device of the present invention having the aforementioned structure, the input side and the output side are separated from each other, whereby stroke of a brake operating means can be prevented from being varied even when braking pressure control is conducted in a brake circuit on the brake cylinder side after a control valve independently of the input of the input side during normal braking operation so that the consumption of brake fluid is varied.

The device can provide desired stroke characteristic of the brake operating means without being affected by variation in consumption of brake fluid on the output side of the brake fluid pressure generating device.

Further, the device allows the braking force control in the brake circuit on the brake cylinder side after the control valve to be conducted independently of the input of the input side during normal braking operation. Therefore, the brake fluid pressure generating device of the present invention can be easily and flexibly adopted to a system which needs the control of braking pressure, for example, decreasing the braking pressure for regenerative brake coordination control of a regenerative brake coordination system and increasing the braking pressure for brake assist control of a brake assist system, independently of the operation of the brake operating means during operation of the brake fluid pressure generating device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, embodiments of the present invention will now be described with reference to drawings.

Figure 1:
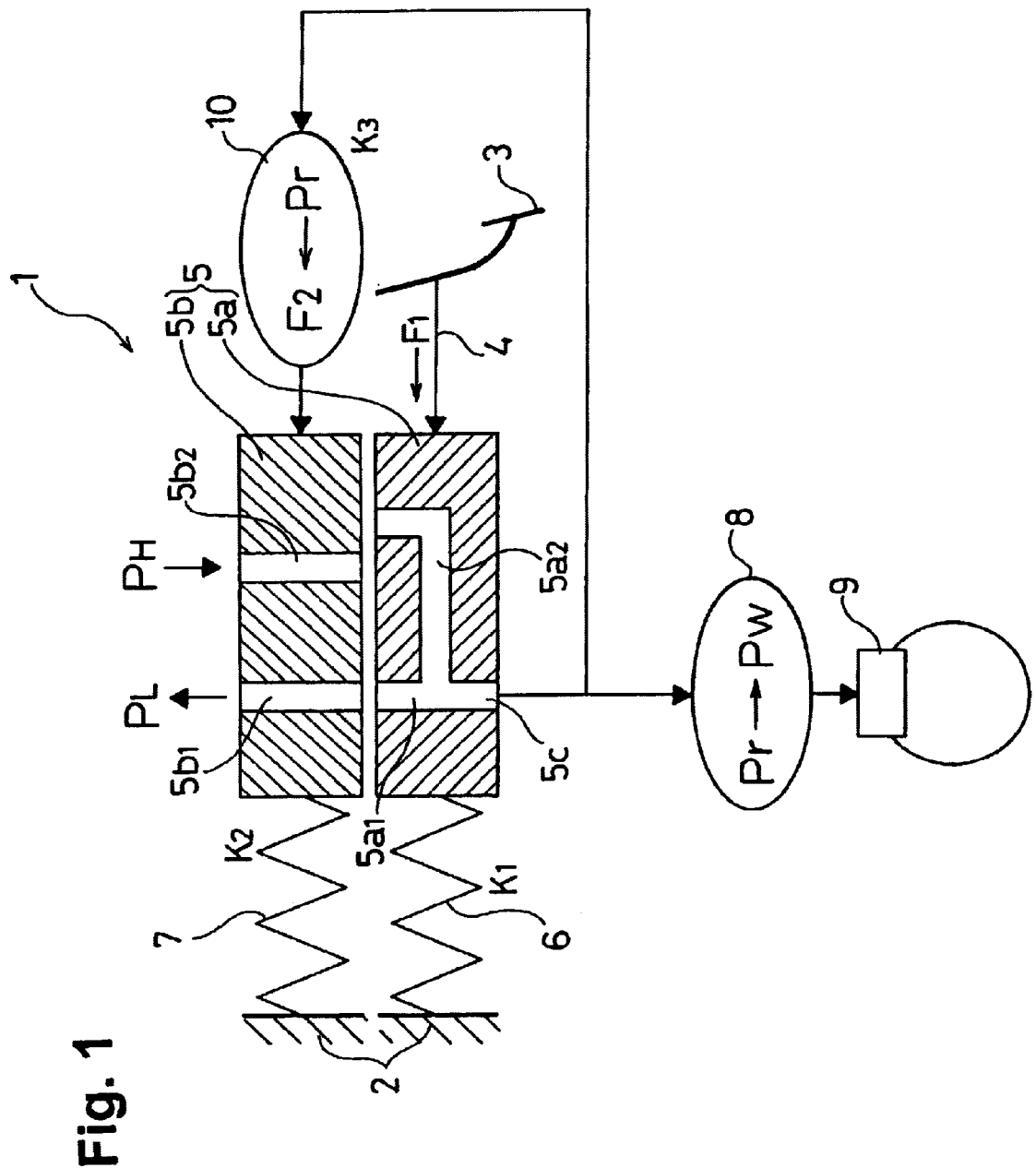
FIG. 1 is a view schematically showing a brake system to which a first embodiment of a brake fluid pressure generating device according to the present invention is adopted.

FIG. 1 is a view schematically showing a brake system to which a first embodiment of the brake fluid pressure generating device according to the present invention is adopted.

As shown in FIG. 1, a brake system to which a brake fluid pressure generating device 1 of the first embodiment is adopted comprises a housing 2, a brake pedal 3 as a brake operating means, an input shaft 4 which is actuated by the input transmitted through the brake pedal 3 to move to the left, a control valve 5 which has first and second valve elements 5a, 5b and is actuated by the actuation of the input shaft 4 to output pressure of a pressure source (not shown) controlled according to the input applied by depression of the brake pedal 3 (pedal stroke, pedaling force), a first stroke/force converter 6 composed of, for example, a first spring which converts the stroke of the first valve element 5a corresponding to the pedal stroke into a first valve element converted force (the first force of the present invention) by a converting factor $k_1$ (the spring constant $k_1$ of the first spring in the illustrated example: the third converting factor of the present invention) and applies the first valve element converted force to the first valve element 5a, a second valve element stroke/force converter 7 composed of, for example, a second spring which converts the stroke of the second valve element 5b into a second valve element converted force by a converting factor $k_2$ (the spring constant $k_2$ of the second spring in the illustrated example: the first converting factor of the present invention) and applies the second valve element converted force to the second valve element 5b, a braking pressure controller 8 controlling the control valve output pressure $P_r$ to braking pressure $P_w$, wheel cylinder(s) 9 which receive the braking pressure $P_w$ so as to generate a braking force, and an first control valve output-pressure/force converter 10 which converts the control valve output pressure $P_r$ into a first control valve converted force $F_2$ (the second force of the present invention) by a converting factor $k_3$ (the second converting factor of the present invention) and applies the first control valve converted force $F_2$ to the second valve element 5b. In this case, the brake fluid pressure generating device 1 of the first embodiment is composed of the housing 2, the input shaft 4, the control valve 5, the first and second valve element stroke/force converters 6, 7, and the first control valve output-pressure/force converter 10.

The control valve 5 comprises a first valve element 5a and a second valve element 5b which are arranged movably relative to each other. The first valve element 5a is provided with an output port 5c of the control valve 5 which is always in communication with the wheel cylinder(s) 9 and the first control valve output-pressure/force converter 10, a first valve passage $5a_1$ which is always in communication with the output port 5c and can be connected to or isolated from a low-pressure ($P_L$) valve passage $5b_1$ of the second valve element 5b described later, and a second valve passage $5a_2$ which is always in communication with the output port 5c and can be connected to or isolated from a high-pressure ($P_H$) valve passage $5b_2$ of the second valve element 5b. The second valve element 5b is provided with the low-pressure ($P_L$) valve passage $5b_1$ always communicating with a low-pressure discharge portion (not shown) such as a reservoir in which brake fluid is stored and to which brake fluid in the brake fluid pressure generating device 1 is discharged and a vacuum source, and the high-pressure ($P_H$) valve passage $5b_2$ is always in communication with an external pressure source (not shown) for generating high pressure as the operational pressure for operating the brake fluid pressure generating device 1.

The first valve element 5a is designed to receive the input of the input shaft 4 and also receive the first valve element converted force of the first stroke/force converter 6 in a direction of opposing the input of the input shaft 4. The second valve element 5b is designed to receive the first control valve converted force $F_2$ of the first control valve output-pressure/force converter 10 and also receive the second valve element converted force of the second valve element stroke/force converter 7 in a direction of opposing the first control valve converted force $F_2$.

The first valve element 5a can take an inoperative position as illustrated where it connects the first valve passage $5a_1$ to the low-pressure ($P_L$) valve passage $5b_1$ and isolates the second valve passage $5a_2$ from the high-pressure ($P_H$) valve passage $5b_2$.

The brake system employing this brake fluid pressure generating device 1 of the first embodiment is a full power type brake system in which the control valve output pressure $P_r$ outputted from the output port 5c of the first valve element 5a is controlled to be the braking pressure $P_w$ by the braking pressure controller 8 so that the braking pressure $P_w$ is supplied to the wheel cylinder(s) 9.

Hereinafter, description will be made as regard to the operation of the brake system with the brake fluid pressure generating device 1 of the first embodiment having the aforementioned structure.

In the inoperative state, as shown in FIG. 1, of the brake fluid pressure generating device 1 when the brake pedal 3 is not depressed, the control valve 5 is in the inoperative position where the first valve passage $5a_1$ is connected to the low-pressure valve passage $5b_1$ and the second valve passage $5a_2$ is isolated from the high-pressure valve passage $5b_2$. Therefore, the braking pressure controller 8, the wheel cylinder(s) 9, and the first control valve output-pressure/force converter 10 are connected to the low-pressure discharge portion through the output port 5c, the first valve passage $5a_1$, and the low-pressure valve passage $5b_1$, respectively so that no pressure is supplied to the braking pressure controller 8, the wheel cylinder(s) 9, and the first control valve output-pressure/force converter 10 and no stroke is supplied to the first and second valve element stroke/force converters 6, 7.

As the brake pedal 3 is depressed, the pedal input corresponding to the operation of the brake pedal 3 is transmitted to the input shaft 4, so the input shaft 4 moves (travels) to the left according to the input. This input acts on the first valve element 5a so as to press the first valve element 5a. Then, the first valve element 5a travels to the left relative to the second valve element 5b. During this, the stroke of the first valve element 5a is applied to the first stroke/force converter 6 so that the first stroke/force converter 6 converts the stroke of the first valve element 5a by the converting factor $k_1$ into a first valve element converted force according to the stroke. Thus, the first valve element 5a travels to the left against the first valve element converted force and becomes in the operative position where the first valve passage $5a_1$ is isolated from the low-pressure valve passage $5b_1$ and the second valve passage $5a_2$ is connected to the high-pressure valve passage $5b_2$. That is, the control valve 5 is switched so that control valve output pressure $P_r$ is developed at the output port 5c by the pressure from the pressure source. The control valve output pressure $P_r$ is controlled by the braking pressure controller 8 into predetermined braking pressure $P_w$ and the braking pressure $P_w$ is supplied to the wheel cylinder(s) 9. Therefore, the wheel cylinder(s) 9 produces a braking force, thereby actuating the brake. The first valve element converted force of the first stroke/force converter 6 is transmitted as a reaction force to the brake pedal 3 through the first valve element 5a and the input shaft 4 so that the driver feels this reaction force.

During this, the control valve output pressure $P_r$ is also supplied to the first control valve output-pressure/force converter 10. The first control valve output-pressure/force converter 10 converts the control valve output pressure $P_r$ into a first control valve converted force $F_2$ by the converting factor $k_3$ and applies the first control valve converted force $F_2$ to the second valve element 5b. Then, the second valve element 5b travels to the left relative to the first valve element 5a. During this, the stroke of the second valve element 5b is applied to the second valve element stroke/force converter 7. The second valve element stroke/force converter 7 converts the stroke of the second valve element 5b by the converting factor $k_2$ into a second valve element converted force according to the stroke. Therefore, the second valve element 5b travels to the left against the second valve element converted force.

Then, the first valve element 5a is controlled to balance the input of the input shaft 4 with the first valve element converted force of the first stroke/force converter 6, while the second valve element 5b is controlled to balance the first control valve converted force $F_2$ of the first control valve output-pressure/force converter 10 with the second valve element converted force of the second valve element stroke/force converter 7. When the forces applied to the first valve element 5a are balanced and the forces applied to the second valve element 5b are balanced, the first valve passage $5a_1$ is isolated from the low-pressure valve passage $5b_1$ and the second valve passage $5a_2$ is isolated from the high-pressure valve passage $5b_2$.

Because an equilibrium-of-force expression for the first valve element 5a at this point is $F_1=k_1 \times L_1$ wherein the input from the input shaft 4 (the input corresponding to the pedaling force, hereinafter it will be sometimes referred to as "pedal input") is $F_1$ and the stroke of the first valve element 5a when stopped because the forces are balanced is $L_1$, the following equation is obtained:

$$L_1 = F_1/k_1 \qquad (1)$$

The stroke $L_1$ of the first valve element 5a corresponds to the pedal stroke.

On the other hand, because an equilibrium-of-force expression for the second valve element 5b is $k_3 \times P_r = k_2 \times L_2$ wherein the stroke of the second valve element 5b when the forces applied thereto are balanced is $L_2$, the following equation is obtained:

$$L_2 = k_3 \times P_r / k_2 \qquad (2)$$

Further, the control valve 5 is balanced in an intermediate loaded condition $L_1-L_2=A$ (A: a predetermined value preset for the control valve 5). At this point, from the above expressions (1) and (2), the following equation is obtained:

$$L_1-L_2=(F_1/k_1)-(k_3 \times P_r/k_2)=A$$

Accordingly, the following equation is obtained:

$$P_r=\{k_2/(k_1 \times k_3)\} \times F_1 - (k_2/k_3) \times A \qquad (3)$$

In the brake fluid pressure generating device 1 of the first embodiment, it is found from the equation (1) that the stroke $L_1$ of the first valve element 5a is proportional to the pedal input $F_1$, i.e. the pedal stroke is proportional to the pedaling force. However, since the stroke $L_1$ of the first valve element 5a depends on the converting factor $k_1$ of the first stroke/force converter 6, the stroke $L_1$ of the first valve element 5a is set by the first stroke/force converter 6. That is, the pedal stroke is set by the first stroke/force converter 6, thereby achieving the shortening of stroke as compared to conventional devices.

As apparent from the equation (1), even when the control of the braking pressure $P_w$ is conducted on the output side of the control valve 5 by, for example, the regenerative brake coordination control and/or the brake assist control, the stroke of the first valve element 5a is not affected by such braking pressure control. That is, even when the braking pressure control is conducted on the output side of the control valve 5, the pedal stroke can be prevented from being varied.

From the equation (3), the control valve output pressure $P_r$ is controlled rectilinearly by the input $F_1$ of the input shaft 4, i.e. the pedaling force. In this case, since the braking pressure $P_w$ is controlled to correspond to the control valve output pressure $P_r$, the braking pressure $P_w$ is controlled rectilinearly by the pedaling force.

It should be understood that as the depression of the brake pedal 3 is released so that the input of the input shaft 4 is cancelled, the first and second valve elements 5a, 5b are returned to the inoperative positions so that the control valve 5 becomes in the inoperative state.

As mentioned above, according to the brake fluid pressure generating device 1 of this embodiment, the pedaling force-pedal stroke characteristic and the pedaling force-braking pressure characteristic can be arbitrarily variously set by suitably setting the converting factors $k_1$, $k_2$ (spring constants in the illustrated example) of the first and second valve element stroke/force converter 6, 7 and the converting factor $k_3$ of the first control valve output-pressure/force converter 10.

Figure 2:
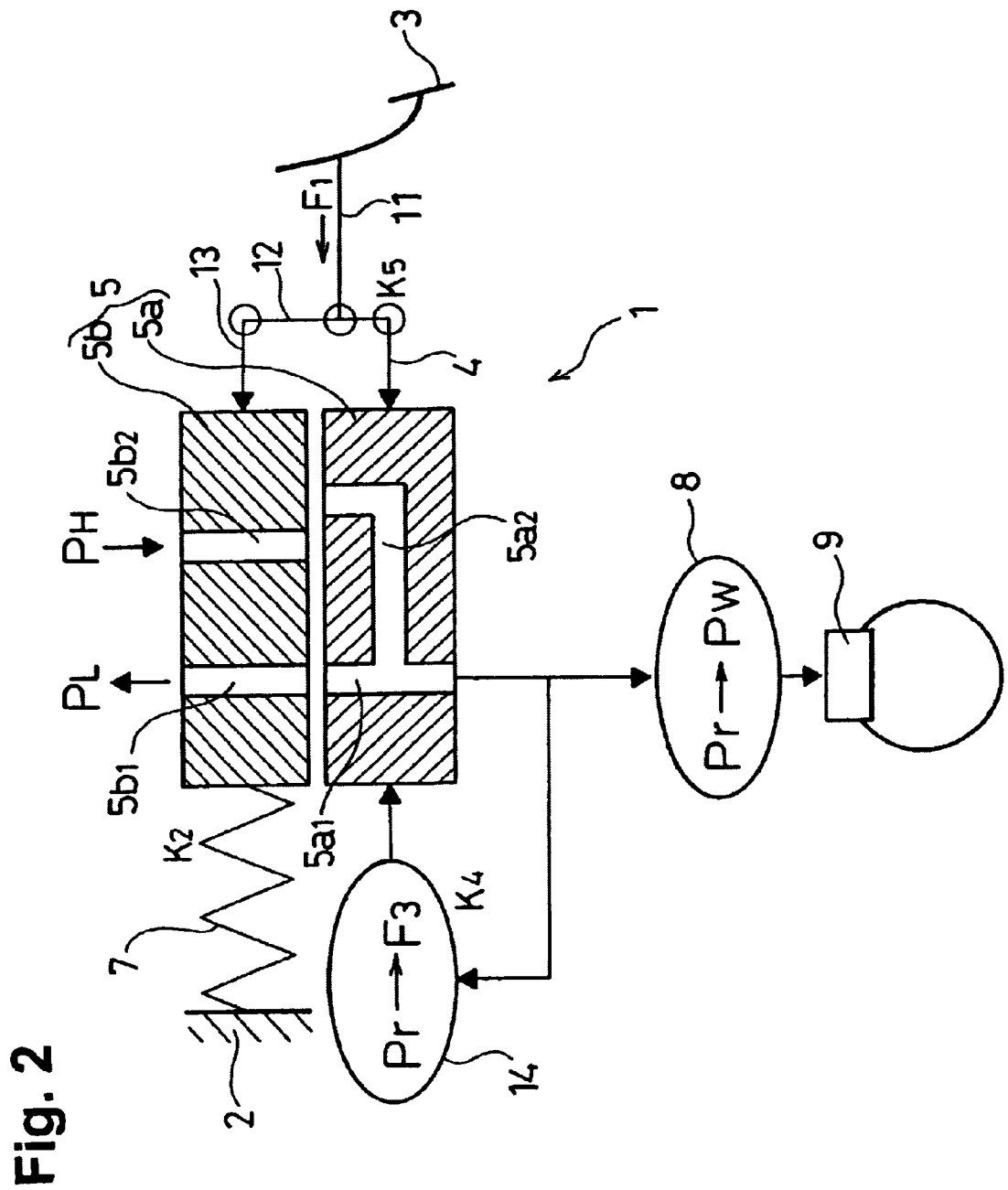
FIG. 2 is a view similar to FIG. 1 but schematically showing a brake system to which a second embodiment of the present invention is adopted.

FIG. 2 is a view similar to FIG. 1 but schematically showing a brake system to which a second embodiment of the present invention is adopted. It should be noted that, for the description of the following embodiments, parts of the following embodiment similar or corresponding to the parts of the prior embodiment will be marked by the same reference numerals and the detail description of the parts will be omitted.

In the brake fluid pressure generating device 1 of the first embodiment described above, the input shaft 4 of the first valve element 5a is directly connected to the lever of the brake pedal 3 and the first control valve converted force $F_2$ that is converted from the control valve output pressure $P_r$ by the first control valve output-pressure/force converter 10 is applied to the second valve element 5b. However, in the brake fluid pressure generating device 1 of the second embodiment, the input shaft 4 of the first valve element 5a is not directly connected to the lever of the brake pedal 3 and the first control valve output-pressure/force converter 10 is not provided.

That is, as shown in FIG. 2, the brake fluid pressure generating device 1 of the second embodiment is provided with an input distributor 12 which distributes the input according to a distribution factor $k_5$ (the first or second distribution factor of the present invention) and which is attached to a connection shaft 11 pivotally connected to the lever of the brake pedal 3. Connected to the input distributor 12 are the input shaft 4 and a press shaft 13. In the illustrated example, the input distributor 12 is composed of a control lever of which a point shifted from the center is pivotally connected to the connection shaft 11. The input shaft 4 is pivotally connected to one end of the input distributor 12 which is nearer to the connection point to which the connection shaft 11 is connected. In other words, assuming that the distributor 12 comprises a short arm side and a long arm side which are divided at the connection point to which the connection shaft 11 is connected, the input shaft 4 is pivotally connected to the end of the short arm side. Therefore, one component of force $F_1$ produced by the pedaling force exerted to the connection shaft 11 is applied to the input shaft 4. Moreover, the press shaft 13 is pivotally connected to the other end of the distributor 12 i.e. the end of the long arm side. The other component of the force exerted to the connection shaft 11 is applied to the press shaft 13. The press shaft 13 applies this component as a pressing force (the second force of the present invention) to the second valve element 5b against the second valve element converted force of the second valve element stroke/force converter 7.

Though the first stroke/force converter 6 is provided in the first embodiment, a second control valve output-pressure/force converter 14 is provided, in place of the first stroke/force converter 6, in the second embodiment. The second control valve output-pressure/force converter 14 converts the control valve output pressure $P_r$ into a second control valve converted force $F_3$ (the first force of the present invention) by a converting factor $k_4$ (the fourth converting factor of the present invention) and applies the second control valve converted force $F_3$ to the first valve element 5a against the input of the input shaft 4.

Though the input of the input shaft 4 is one component of force of the connection shaft 11 because of the input distributor 12, the force of the connection shaft 11 is described by $F_1$ for the convenience of explanation.

The other components of the brake system of the second embodiment are the same as those of the first embodiment.

In the brake system of the second embodiment having the aforementioned structure, as the brake pedal 3 is depressed, the force corresponding to the pedaling force is transmitted as input to the input distributor 12 through the connection shaft 11. The input $F_1$ applied to the input distributor 12 is distributed at the distribution factor $k_5$ (the lever ratio of the control lever 12 of the illustrated example) by the input distributor 12 so that a larger component of the force is applied to the input shaft 4 and a smaller component of the force is applied as a pressing force of the second valve element 5b to the press shaft 13.

Then, the first valve element 5a travels to the left relative to the second valve element 5b and the first valve passage $5a_1$ is isolated from the low-pressure valve passage $5b_1$ and the second valve passage $5a_2$ is connected to the high-pressure valve passage $5b_2$. That is, in the same manner as the first embodiment, control valve output pressure $P_r$ is developed at the output port 5c by the pressure from the pressure source. The control valve output pressure $P_r$ is controlled by the braking pressure controller 8 into predetermined braking pressure $P_w$ and the braking pressure $P_w$ is supplied to the wheel cylinder(s) 9. Therefore, the wheel cylinder(s) 9 produces a braking force, thereby actuating the brake. The second control valve converted force $F_3$ which is converted from the control valve output pressure $P_r$ by the second control valve output-pressure/force converter 14 is transmitted as a reaction force to the input shaft 4 and is further transmitted to the brake pedal 3 through the input distributor 12 and the connection shaft 11. The second valve element 5b is pressed by the pressing force of the press shaft 13 so as to travel to the left relative to the housing 2 against the second valve element converted force of the second valve element stroke/force converter 7.

Then, the first valve element 5a is controlled to balance the component of force on the input shaft 4 with the second control valve converted force $F_3$ of the second control valve output-pressure/force converter 14, while the second valve element 5b is controlled to balance the pressing force of the press shaft 13 with the second valve element converted force of the second valve element stroke/force converter 7. Because an equilibrium-of-force expression for the first valve element 5a at this point is $k_5 \times F_1 = k_4 \times P_r$, the following equation is obtained:

$$P_r = (k_5 \times k_4) \times F_1 \quad (4)$$

On the other hand, because an equilibrium-of-force expression for the second valve element 5b is $(1-k_5) \times F_1 = k_2 \times L_2$, the following equation is obtained:

$$L_2 = [(1-k_5)/k_2] \times F_1 \quad (5)$$

Further, the stroke $L_1$ of the first valve element 5a in an intermediate loaded condition when balanced is expressed by:

$$L_1 = L_2 + A = [(1-k_5)/k_2] \times F_1 + A \quad (6)$$

In the brake fluid pressure generating device 1 of the second embodiment, it is found from the equation (6) that the stroke $L_1$ of the first valve element 5a is proportional to the input $F_1$. However, since the stroke $L_1$ of the first valve element 5a depends on the converting factor $k_2$ of the second valve element stroke/force converter 7 and the distribution factor $k_5$ of the input distributor 12, the stroke $L_1$ of the first valve element 5a is set by the second valve element stroke/force converter 7 and the input distributor 12. That is, the pedal stroke is set by the second valve element stroke/force converter 7 and the input distributor 12, thereby achieving the shortening of stroke as compared to conventional devices.

As apparent from the equations (5) and (6), even when the control of the braking pressure $P_w$ is conducted on the output side of the control valve 5 by, for example, the braking pressure controller 8 as mentioned above near the wheel cylinder(s) 9, the stroke of the first valve element 5a is not affected by such braking pressure control. That is, even when the braking pressure control is conducted on the output side of the control valve 5, the pedal stroke can be prevented from being varied.

From the equation (4), the control valve output pressure $P_r$ is controlled rectilinearly by the component of force $(k_5 \times F_1)$ on the input shaft 4, i.e. the pedaling force. In this case, since the braking pressure $P_w$ is controlled to correspond to the control valve output pressure $P_r$, the braking pressure $P_w$ is controlled rectilinearly by the pedaling force.

As mentioned above, according to the brake fluid pressure generating device 1 of the second embodiment, the pedaling force-pedal stroke characteristic and the pedaling force-braking pressure characteristic can be arbitrarily variously set by suitably setting the converting factor $k_2$ of the second valve element stroke/force converter 7, the converting factor $k_4$ of the second control valve output-pressure force converter 14, and the distribution factor $k_5$ of the input distributor 12.

The other works and effects of the brake system of the second embodiment are the same as those of the first embodiment.

Figure 3:
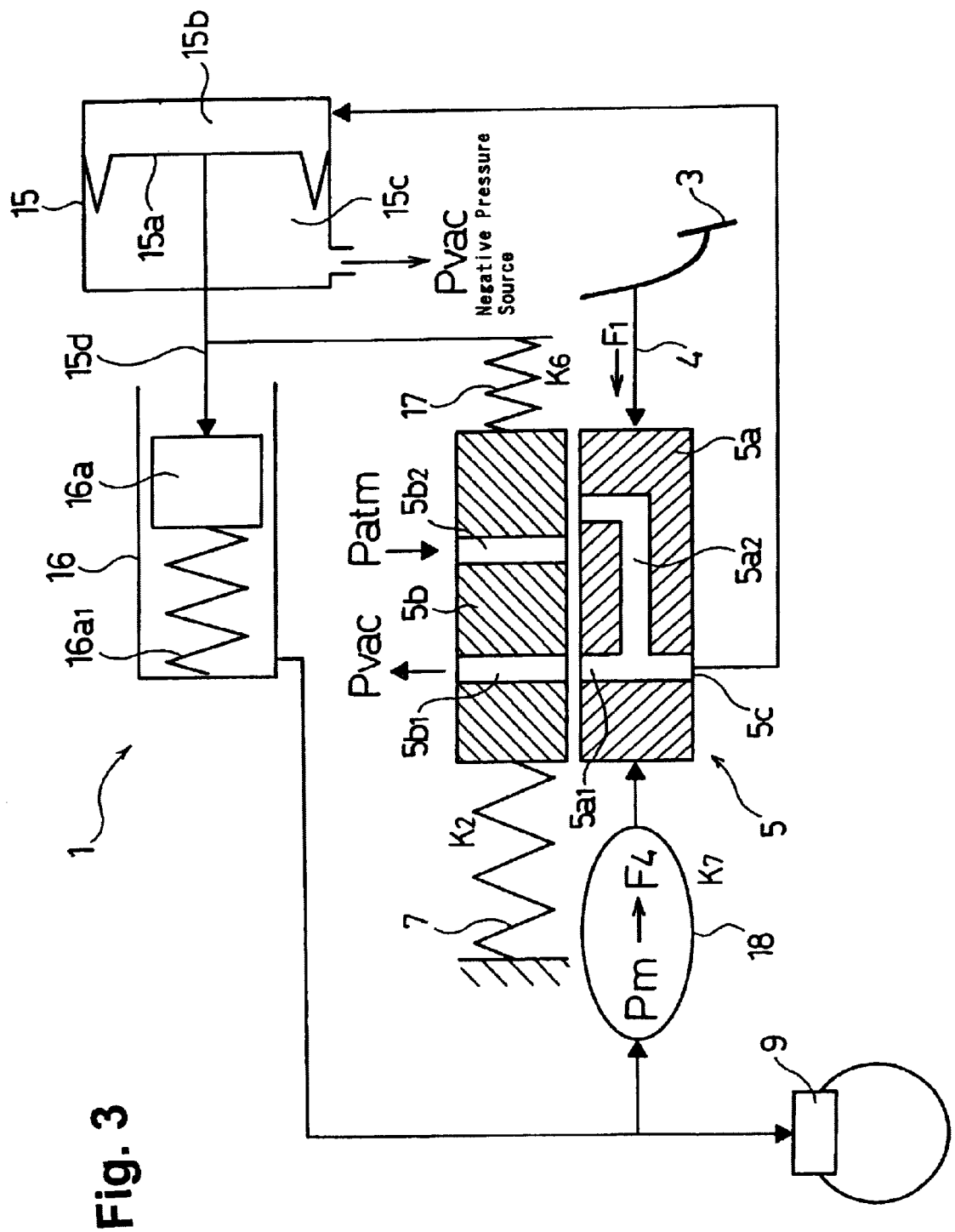
FIG. 3 is a view similar to FIG. 1 but schematically showing a brake system to which a third embodiment of the present invention is adopted.

FIG. 3 is a view similar to FIG. 1 but schematically showing a brake system to which a third embodiment of the present invention is adopted.

In the brake fluid pressure generating device 1 of the first embodiment described above, the first converted force of the first stroke/force converter 6 composed of the first spring is applied to the first valve element 5a and the control valve converted force of the first control valve output-pressure/force converter 10 is applied to the second valve element 5b. However, the brake fluid pressure generating device 1 of this third embodiment is provided with neither the first stroke/force converter 6 nor the first control valve output-pressure/force converter 10. In addition, the device of the third embodiment is not provided with the braking pressure controller 8 of the first embodiment.

As shown in FIG. 3, the brake fluid pressure generating device 1 of the third embodiment is provided with a power cylinder unit 15 which outputs by using negative pressure and atmospheric pressure and a master cylinder 16 which is actuated by the output of the power cylinder unit 15 to generate master cylinder pressure $P_m$. The atmospheric pressure $P_{atm}$ is used as the high pressure source and a negative pressure source which produces negative pressure $P_{vac}$ is used as the low-pressure discharge portion.

The power cylinder unit 15 comprises a power piston 15a, a power chamber 15b and a negative pressure chamber 15c which are partitioned by the power piston 15, and an output shaft 15d which is actuated by the power piston 15a. The output port 5c of the first valve element 5a is always in communication with the power chamber 15b of the power cylinder unit 15, not the wheel cylinder(s) 9, so as to allow the introduction of pressure controlled by the control valve 5 based on the atmospheric pressure $P_{atm}$ or the introduction of negative pressure. The negative pressure chamber 15c is always in communication with the negative pressure source so that negative pressure is introduced into the negative pressure chamber 15c. As the pressure controlled by the control valve 5 is introduced into the power chamber 15b, the power piston 15a travels to the left with the pressure in the power chamber 15b so that the power cylinder unit 15 outputs a force, which is a boosted pedaling force, through the output shaft 15d.

The master cylinder 16 comprises a master cylinder piston 16a and a return spring $16a_1$. The output shaft 15d of the power cylinder unit 15 is in contact with the master cylinder piston 16a. Therefore, the master cylinder piston 16a is actuated by the output of the power cylinder unit 15 so as to generate master cylinder pressure. The master cylinder pressure is supplied as the braking pressure $P_w$ to the wheel cylinder(s) 9, thereby actuating the brake.

Arranged between the output shaft 15d of the power cylinder unit 15 and the second valve element 5b is a third stroke/force converter (the third spring in the illustrated example) 17. The third stroke/force converter 17 converts the stroke of the output shaft 15d by the converting factor $k_6$ (the fifth converting factor of the present invention) into a third converted force (the second force of the present invention). The third converted force is applied to the second valve element 5b against the second valve element converted force of the second valve element stroke/force converter 7.

Arranged between the master cylinder 16 and the first valve element 5a is a master cylinder pressure/force converter 18. The master cylinder pressure/force converter 18 converts the master cylinder pressure (i.e. the braking pressure $P_w$) by the converting factor $k_7$ (the sixth converting factor of the present invention) into a master cylinder converted force $F_4$ (the first force of the present invention) and applies the master cylinder converted force $F_4$ to the first valve element 5a against the input $F_1$ of the input shaft 4.

In this manner, in the brake fluid pressure generating device 1 of the third embodiment, the second valve element 5b is provided separately from the power piston 15a.

The other components of the brake system of the third embodiment are the same as those of the first embodiment.

In the inoperative state, as illustrated, of the brake fluid pressure generating device 1, the first valve passage $5a_1$ is connected to the low-pressure valve passage $5b_1$ and the second valve passage $5a_2$ is isolated from the high-pressure valve passage $5b_2$ just like the aforementioned first embodiment. That is, the power chamber 15b of the power cylinder unit 15 is connected to the negative pressure source through the control valve 5. Therefore, the power cylinder unit 15 does not output so that the master cylinder 16 does not generate the master cylinder pressure. This means that no master cylinder pressure is supplied to the wheel cylinder(s) 9 and the master cylinder pressure/force converter 18 and no stroke is supplied to the second and third stroke/force converters 7, 17.

As the brake pedal 3 is depressed, the input shaft 4 travels to the left according to the pedal input $F_1$ and thus applies the input $F_1$ to the first valve element 5a to press the first valve element 5a. Then, the first valve element 5a travels to the left relative to the second valve element 5b so that the first valve passage $5a_1$ is isolated from the low-pressure valve passage $5b_1$ and the second valve passage $5a_2$ is connected to the high-pressure valve passage $5b_2$. That is, the control valve 5 is switched so that control valve output pressure $P_r$ is developed at the output port 5c based on the atmospheric pressure. The control valve output pressure $P_r$ is introduced into the power chamber 15b of the power cylinder unit 15.

Then, the power piston 15a travels to the left because of the control valve output pressure $P_r$ introduced into the power chamber 15b and the output shaft 15d travels to the left, whereby the power cylinder unit 15 outputs. By the output of the power cylinder unit 15, the master cylinder piston 16a travels to the left, whereby the master cylinder 16 generates master cylinder pressure $P_m$. The master cylinder pressure $P_m$ is supplied as the braking pressure $P_w$ to the wheel cylinder(s) 9, thereby actuating the brake. During this, the master cylinder pressure $P_m$ is also supplied to the master cylinder pressure/force converter 18 so that the master cylinder pressure is converted into the master cylinder converted force $F_4$ by the master cylinder pressure/force converter 18. The master cylinder converted force $F_4$ is transmitted as a reaction force to the brake pedal 3 through the first valve element 5a and the input shaft 4.

The stroke of the output shaft 15d of the power cylinder unit 15 is supplied to the third stroke/force converter 17 so that the third stroke/force converter 17 converts the stroke of the output shaft 15d into the third converted force and applies the third converted force to the second valve element 5b. Thus, the second valve element 5b travels to the left relative to the first valve element 5a against the second valve element converted force of the second valve element stroke/force converter 7. The first valve element 5a is controlled to balance the input of the input shaft 4 with the master cylinder converted force $F_4$ of the master cylinder pressure/force converter 18, while the second valve element 5b is controlled to balance the second and third converted force of the second and third stroke/force converters 7, 17.

An equilibrium-of-force expression for the first valve element 5a at this point is obtained by:

$$F_1 = k_7 \times P_m \qquad (7)$$

On the other hand, an equilibrium-of-force expression for the second valve element 5b is obtained by:

$$k_2 \times L_2 = k_6 \times L_3 \quad (8)$$

wherein $L_3$ is the stroke of the output shaft 15d (i.e. the power piston 15a).

By the way, the stroke of the master cylinder piston 16a is the same as the stroke $L_3$ of the output shaft 15d and is proportional to the consumption (the consumption depends on the vehicle type) of brake fluid at the wheel cylinder 9 side. In addition, the consumption depends on the master cylinder pressure $P_m$ and the relation between the master cylinder pressure $P_m$ and the stroke of the master cylinder piston 16a can be indicated by a straight line when the deceleration (g) of vehicle is in a normal braking range. Therefore, the stroke $L_3$ is expressed by $L_3 = k_8 \times P_m$ ($k_8$: proportional constant).

Therefore, the equation (8) can be converted to $k_2 \times L_2 = k_6 \times k_8 \times P_m$ so that the stroke $L_2$ of the second valve element 5b is expressed by:

$$L_2 = [(k_6 \times k_8)/(k_2 \times k_7)] \times F_1 \quad (9)$$

It should be considered that the relation between the master cylinder pressure $P_m$ and the stroke of the master cylinder piston 16a may be indicated by a curve when the deceleration (g) is in a quite high range.

Further, since $L_1 - L_2 = A$ as mentioned above, the stroke $L_1$ of the first valve element 5a in an intermediate loaded condition when balanced is expressed by:

$$L_1 = L_2 + A = [(k_6 \times k_8)/(k_2 \times k_7)] \times F_1 + A \quad (10)$$

In the brake fluid pressure generating device 1 of the third embodiment, it is found from the equation (10) that the stroke $L_1$ of the first valve element 5a is proportional to the input $F_1$, that is, the pedal stroke is proportional to the pedaling force. However, since the stroke $L_1$ of the first valve element 5a depends on the converting factor $k_2$ of the second valve element stroke/force converter 7, the converting factor $k_6$ of the third stroke/force converter 17, and the converting factor $k_7$ of the master cylinder pressure/force converter 18, the stroke $L_1$ of the first valve element 5a is set by the second valve element stroke/force converter 7, the third stroke/force converter 17, and the master cylinder pressure/force converter 18. That is, the pedal stroke is set by the second valve element stroke/force converter 7, the third stroke/force converter 17, and the master cylinder pressure/force converter 18, thereby achieving the shortening of stroke as compared to conventional devices.

It should be noted that as the control of the braking pressure $P_w$ is conducted on the wheel cylinder 9 side of the master cylinder 16, the stroke of the master cylinder piston 16a is varied so that the pedal stroke is also varied depending on the variation in the stroke of the master cylinder piston 16a.

From the equation (7), the master cylinder pressure $P_m$ is controlled rectilinearly by the input $F_1$ of the input shaft 4 i.e. the pedaling force and the control valve output pressure $P_r$ is proportional to the master cylinder pressure $P_m$. This means that the control valve output pressure $P_r$ is controlled rectilinearly by the input $F_1$ of the input shaft 4 i.e. the pedaling force.

As mentioned above, according to the brake fluid pressure generating device 1 of the third embodiment, the pedaling force-pedal stroke characteristic and the pedaling force-braking pressure characteristic can be arbitrarily variously set by suitably setting the converting factors $k_2$, $k_6$ (both are spring constants in the illustrated example) of the second and third stroke/force converters 7, 17 and the converting factor $k_7$ of the master cylinder pressure/force converter 18.

The other works and effects of the brake system of the third embodiment are the same as those of the first embodiment.

It should be noted that the power cylinder unit 15 in the third embodiment may be a power cylinder unit 15 utilizing fluid pressure, instead of negative pressure and atmospheric pressure.

Figure 4:
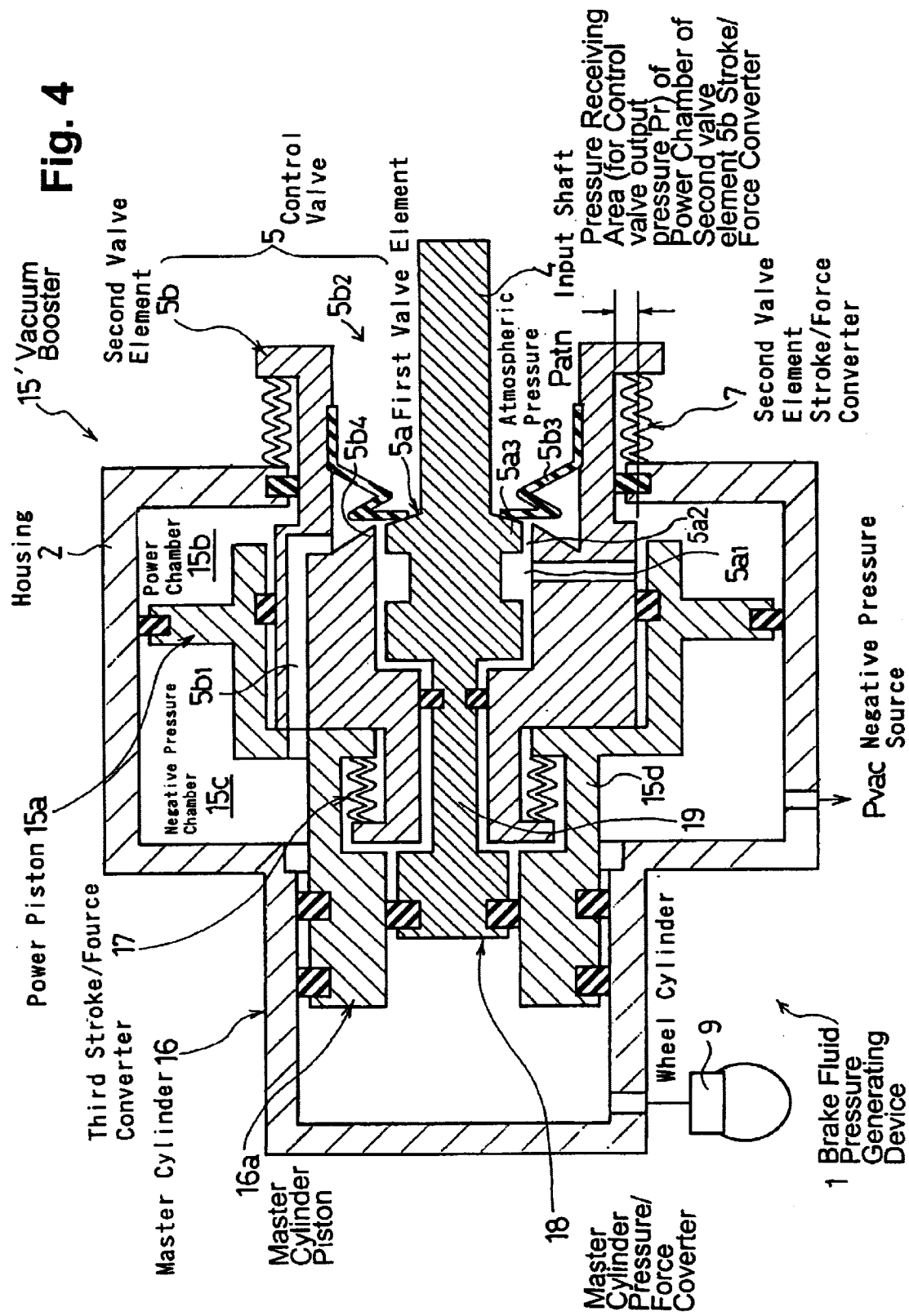
FIG. 4 is a view schematically showing a first concrete example in which the brake fluid pressure generating device of the third embodiment shown in FIG. 3 is adopted to a brake fluid pressure generating device comprising a vacuum booster and a master cylinder.

FIG. 4 is a view schematically showing a first concrete example in which the brake fluid pressure generating device 1 of the third embodiment shown in FIG. 3 is adopted to a brake fluid pressure generating device comprising a vacuum booster and a master cylinder.

As shown in FIG. 4, in the first concrete example, a vacuum booster 15' is employed as the power cylinder unit 15, and the housing 2 of the control valve 5 is commonly used as the housing of the vacuum booster 15' and the housing of the master cylinder 16. The first valve element 5a of the control valve 5 is integrally formed with the input shaft 4. The second valve element 5b of the control valve 5 is formed in a cylindrical shape surrounding the outer periphery of the input shaft 4 and the outer periphery of the first valve element 5a and is slidably and air-tightly supported in the housing 2 in such a position that the second valve element 5b extends to the inside and the outside of the housing 2.

Further, the power piston 15a is formed in a cylindrical shape and is fitted between the housing 2 and the second valve element 5b in such a manner that the power piston 15a is slidable and air-tight relative to the outer periphery of the second valve element 5b and the inner periphery of the housing 2. In this case, the outer diameter of a portion of the second valve element 5b air-tightly sliding relative to the power piston 15a is set larger than the outer diameter of a portion of the second valve element 5b air-tightly sliding relative to the housing 2. Therefore, in the first concrete example as compared to the third embodiment, in addition to the converted force by the third stroke/force converter 17, the control valve converted force by a master cylinder pressure/force converter 18 is also applied to the second valve element 5b in such a direction as to counteract the converted force by the second valve element stroke/force converter 7. To design that only the converted force by the third stroke/force converter 17 is applied to the second valve element 5b, the outer diameters of the both portions are set to be equal.

The output shaft 15d is formed integrally with the power piston 15a and the cylindrical master cylinder piston 16a is further formed integrally with the output shaft 15d. The output shaft 15d is slidably and air-tightly supported in the housing 2 for the vacuum booster 15' and the master cylinder piston 16a is slidably and air-tightly fitted in the housing 2 for the master cylinder 16.

The second valve element 5b of the control valve 5 comprises a valve body $5b_3$ and a negative pressure valve seat $5b_4$ which the valve body $5b_3$ can be seated on and separated from. The first valve element 5a comprises an atmospheric pressure valve seat $5a_3$ which the valve body $5b_3$ can be seated on and separated from. The valve body $5b_3$ cooperates with the atmospheric pressure valve seat $5a_3$ to form an atmospheric pressure valve and the valve body $5b_3$ cooperates with the negative pressure valve seat $5b_4$ to form a negative pressure valve. The first valve element 5a of the first concrete example is not formed with the first and second valve passages $5a_1$, $5a_2$, which are formed in the first valve element 5a of the third embodiment. A first valve passage $5a_1$ of the first concrete example is composed of the combination of a radial hole formed in the second valve element 5b and an annular space formed between the outer periphery of the first valve element 5a and the inner periphery of the second valve element 5b, wherein the radial hole is always in communication with the power chamber 15b. Moreover, a second valve passage $5a_2$ of the first concrete example is composed of an annular space (without reference numeral) located inside the atmospheric pressure valve i.e. located at the negative pressure side of a position where the valve body $5b_3$ is seated on the atmospheric pressure valve seat $5a_3$.

In the inoperative state of the vacuum booster 15' as illustrated, the valve body $5b_3$ is seated on the atmospheric pressure valve seat $5a_3$ so that the atmospheric pressure valve is closed and the valve body $5b_3$ is separated from the negative valve seat $5b_4$ so that the negative pressure valve is open. The first valve passage $5a_1$ is connected to the low-pressure passage $5b_1$ and the second valve passage $5a_2$ is isolated from the high-pressure passage $5b_2$. Therefore, in the inoperative state of the vacuum booster 15', the power chamber 15b and the negative pressure chamber 15c communicate with each other so that negative pressure is introduced into the power chamber 15b. In the operative state of the vacuum booster 15' in which the input shaft 4 travels to the left, the valve body $5b_3$ is seated on the negative pressure valve seat $5b_4$ so that the negative pressure valve is closed and the valve body $5b_3$ is separated from the atmospheric pressure valve seat $5a_3$ so that the atmospheric pressure valve is open, whereby the second valve passage $5a_2$ is connected to the high-pressure passage $5b_2$ and the first valve passage $5a_1$ is isolated from the low-pressure passage $5b_1$. Therefore, in the operative state of the vacuum booster 15', since the power chamber 15b is isolated from the negative pressure chamber 15c and communicates with the atmosphere, the atmospheric pressure is introduced into the power chamber 15b, thereby actuating the power piston 15a.

The second valve element stroke/force converter 7 composed of a second spring is arranged between the housing 2 of the vacuum booster 15' and the second valve element 5b. The third stroke/force converter 17 composed of a third spring is arranged between the second valve element 5b and the output shaft 15d.

Further, an extension shaft 19 is formed to project leftwardly from the first valve element 5a. The extension shaft 19 slidably and air-tightly fitted in and through the second valve element 5b. The master cylinder pressure/force converter 18 composed of a reaction piston is formed on the end of the extension shaft 19. The reaction piston is fitted in the cylindrical master cylinder piston 16 such that the reaction piston is air-tight and slidable relative to the inner periphery of the master cylinder piston 16a. In this design, master cylinder pressure acts on the reaction piston against the input of the input shaft 4. That is, the master cylinder pressure is converted with a converting factor $K_7$ into a master cylinder converted force $F_4$ by the master cylinder pressure/force converter 18. The master cylinder converted force $F_4$ is transmitted as a reaction force to the brake pedal 3 through the extension shaft 19, the first valve element 5a, and the input shaft 4.

When the brake pedal 3 is not depressed i.e. the brake fluid pressure generating device 1 of the first concrete example having the aforementioned structure is inoperative, the input shaft 4 does not travel to the left and is in the illustrated state. Therefore, since the power chamber 15 and the negative pressure chamber 15c of the vacuum booster 15' communicate with each other so that both of them are at a negative pressure as mentioned above, the power piston 15a does not travel to the left so that no master cylinder pressure is developed by the master cylinder 16.

As the brake pedal 3 is depressed, the input shaft 4 travels to the left, whereby atmospheric pressure is introduced into the power chamber 15b so that the power piston 15a travels to the left as described above. Therefore, the vacuum booster 15' generates output, which is a boosted pedaling force, through the output shaft 15d. By the output of the vacuum booster 15', the master cylinder piston 16a travels to the left, whereby the master cylinder 16 generates master cylinder pressure. The master cylinder pressure is supplied as braking pressure $P_w$ to the wheel cylinder(s) 9, thereby actuating the brake. As described above, the master cylinder pressure is converted to master cylinder converted force $F_4$ by the master cylinder pressure/force converter 18 and is transmitted as a reaction force to the brake pedal 3.

In the intermediate loaded state where the vacuum booster 15' is actuated, the first valve element 5a and the second valve element 5b are both balanced. When the first and second valve element 5a and 5b are balanced, the valve body $5b_3$ is seated on both the negative pressure valve seat $5b_4$ and the atmospheric pressure valve seat $5a_3$. That is, the power chamber 15b is isolated from both the atmosphere and the negative pressure chamber 15c. In this state, the first valve element 5a shifts to the left relative to the second valve element 5b by A ($L_1-L_2$=A as mentioned).

Assuming that the pressure receiving area of the first valve element 5a for receiving the output pressure $P_r$ of the control valve 5 as the pressure of the power chamber 15b is $A_1$, an equilibrium-of-force expression for the first valve element 5a is expressed by:

$$F_1 = k_7 \times P_m + A_1 \times P_r \tag{11}$$

Assuming that the pressure receiving area of the second valve element 5b for receiving the output pressure $P_r$ of the control valve 5 is $A_2$, an equilibrium-of-force expression for the second valve element 5b is expressed by:

$$k_2 \times L_2 = k_6 \times L_3 + A_2 \times P_r \tag{12}$$

Further, the stroke $L_1$ of the first valve element 5a is expressed by:

$$L_1 = L_2 + A = (k_6/k_2) \times L_3 + (A_2/k_2) + P_r + A \tag{13}$$

The works and effects of the brake fluid pressure generating device 1 of the first concrete example are substantially the same as those of the aforementioned third embodiment.

Figure 5:
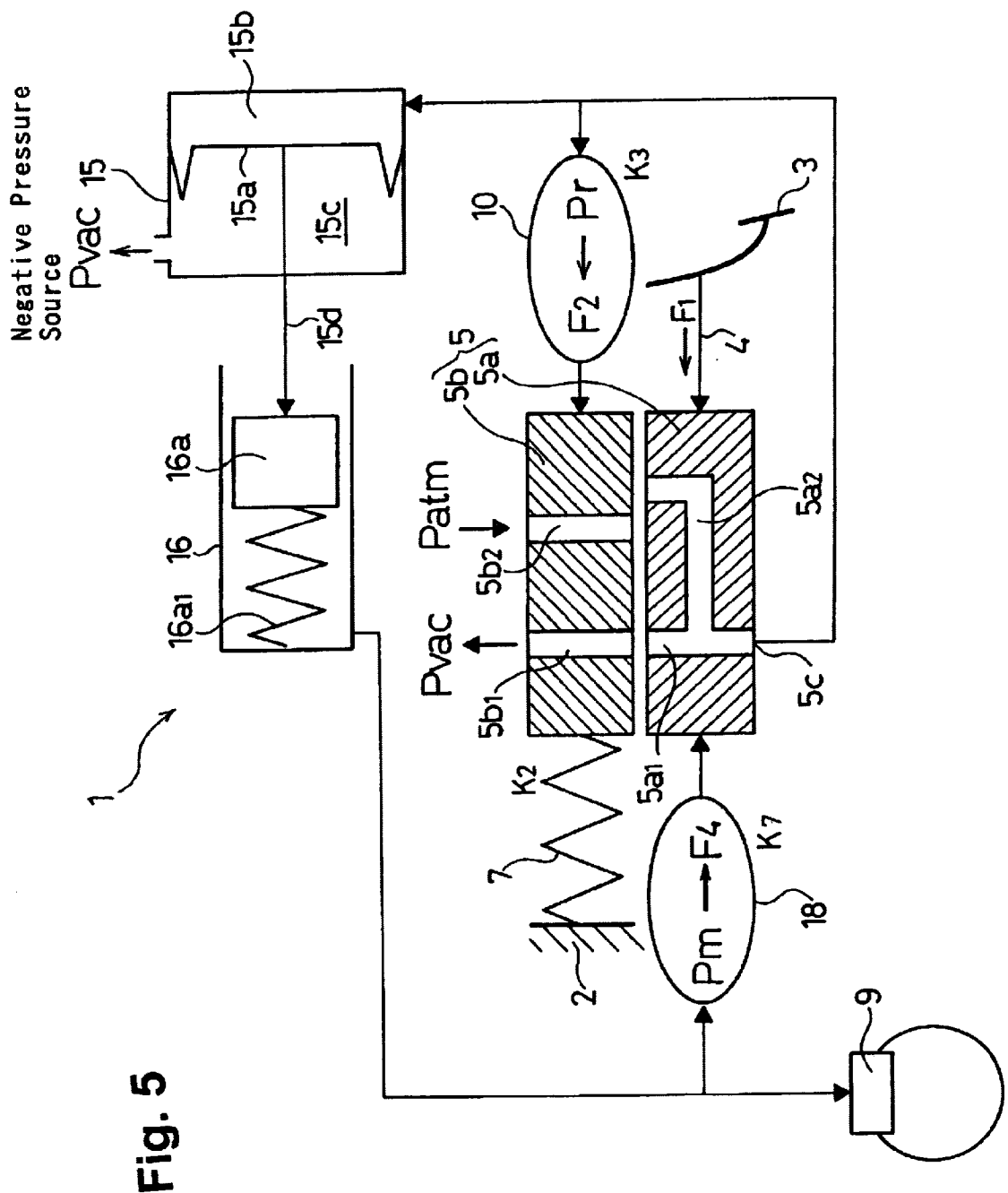
FIG. 5 is a view similar to FIG. 3 but schematically showing a brake system to which a fourth embodiment of the present invention is adopted.

FIG. 5 is a view similar to FIG. 3 but schematically showing a brake system to which a fourth embodiment of the present invention is adopted.

In the aforementioned third embodiment, the third stroke/force converter 17 is provided which converts the stroke of the output shaft 15d of the power cylinder unit 15 by the converting factor $k_6$ into the third converted force and applies the third converted force to the second valve element 5b. However, as shown in FIG. 5, a brake fluid pressure generating device 1 of the fourth embodiment is not provided with the third stroke/force converter 17 and is provided with the first control valve output-pressure/force converter 10 which is employed in the first embodiment shown in FIG. 1. The first control valve output-pressure/force converter 10 converts the control valve output pressure $P_r$ into the first control valve converted force $F_2$ by the converting factor $k_3$ and applies the first control valve converted force $F_2$ to the second valve element 5b in the same manner as the first embodiment.

The other components of the brake system of the fourth embodiment are the same as those of the third embodiment.

In the brake fluid pressure generating device 1 of the fourth embodiment having the aforementioned structure, an equilibrium-of-force expression for the first valve element 5a is the same as that of the third embodiment i.e. expressed by the equation (7). An equilibrium-of-force expression for the second valve element 5b is expressed by:

$$k_2 \times L_2 = k_3 \times P_r \tag{14}$$

Since the control valve output pressure $P_r$ is proportional to the master cylinder pressure $P_m$ and an equation: $P_m = k_9 \times P_r$ is obtained, the stroke $L_2$ of the second valve element 5b is expressed by:

$$L_2 = (k_3/k_2 \times k_9) \times P_m = (k_3/k_2 \times k_4 \times k_9) \times F_1 \tag{15}$$

the stroke $L_1$ of the first valve element 5a is expressed by:

$$L_1 = L_2 + A = (k_3/k_2 \times k_4 \times k_9) \times F_1 + A \tag{16}$$

The brake fluid pressure generating device 1 of the fourth embodiment is different from that of the third embodiment shown in FIG. 3 by that the stroke of the power piston 15a is not affected by the stroke $L_1$ of the first valve element 5a. Therefore, from the equation (16), the stroke $L_1$ of the first valve element 5a is proportional to the pedal input $F_1$ of the input shaft 4 i.e. the pedaling force. From the equation (14) and the equation (15), the control valve output pressure $P_r$ is controlled in proportion to the pedaling force.

The works and effects of the brake system of the fourth embodiment are the same as those of the aforementioned third embodiment.

It should be noted that the power cylinder unit 15 in the fourth embodiment may also be a power cylinder unit 15 utilizing fluid pressure, instead of the power cylinder unit utilizing negative pressure and atmospheric pressure.

Figure 6:
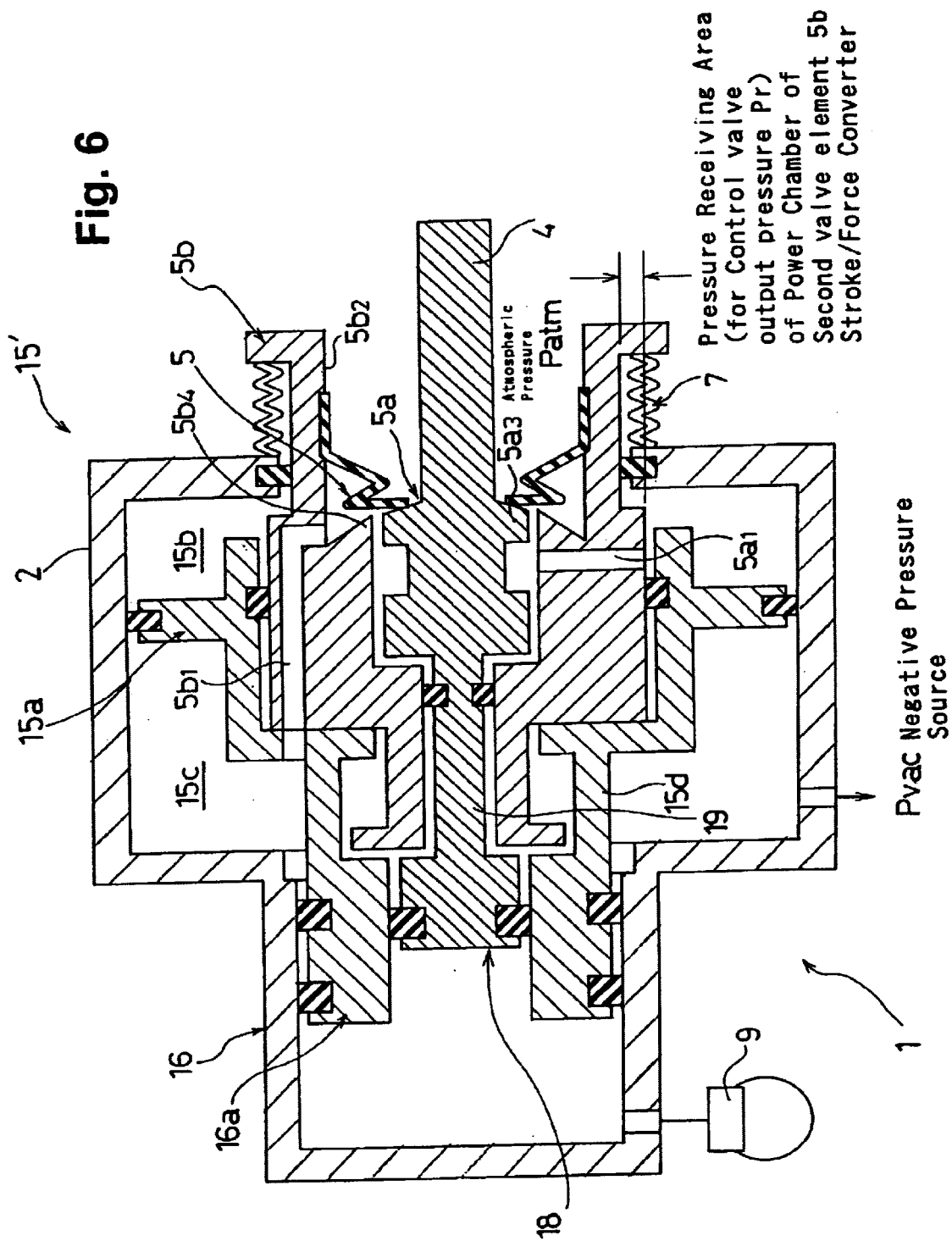
FIG. 6 is a view similar to FIG. 4 but schematically showing a second concrete example in which the brake fluid pressure generating device of the fourth embodiment shown in FIG. 5 is adopted to a brake fluid pressure generating device comprising a vacuum booster and a master cylinder.

FIG. 6 is a view schematically showing a second concrete example in which the brake fluid pressure generating device of the fourth embodiment shown in FIG. 5 is adopted to a brake fluid pressure generating device comprising a vacuum booster and a master cylinder.

As shown in FIG. 6, the second concrete example is similar to the first concrete example shown in FIG. 4, but is different from the first concrete example by that the third stroke/force converter 17 is not provided. Therefore, in the second concrete example, only the control valve converted force by the control valve output-pressure/force converter 10 is applied to the second valve element 5b in such a manner as to counteract the converted force by the second valve element stroke/force converter 7.

The other components of the brake system of the second concrete example are the same as those of the first concrete example.

In the brake fluid pressure generating device 1 of the second concrete example having the aforementioned structure, an equilibrium-of-force expression for the first valve element 5a is the same as that of the first concrete example i.e. expressed by the equation (11). Since $K_6 \times L_3 = 0$ is obtained from the equation (12) because the third stroke/force converter 17 is not provided, an equilibrium-of-force expression for the second valve element 5b is expressed by:

$$k_2 \times L_2 = A_2 \times P_r \tag{17}$$

Further, the stroke $L_1$ of the first valve element 5a is expressed by:

$$L_1 = L_2 + A = (A_2/k_2) \times P_r + A \tag{18}$$

The works and effects of the brake fluid pressure generating device 1 of the second concrete example are substantially the same as those of the aforementioned first concrete example.

Figure 7:
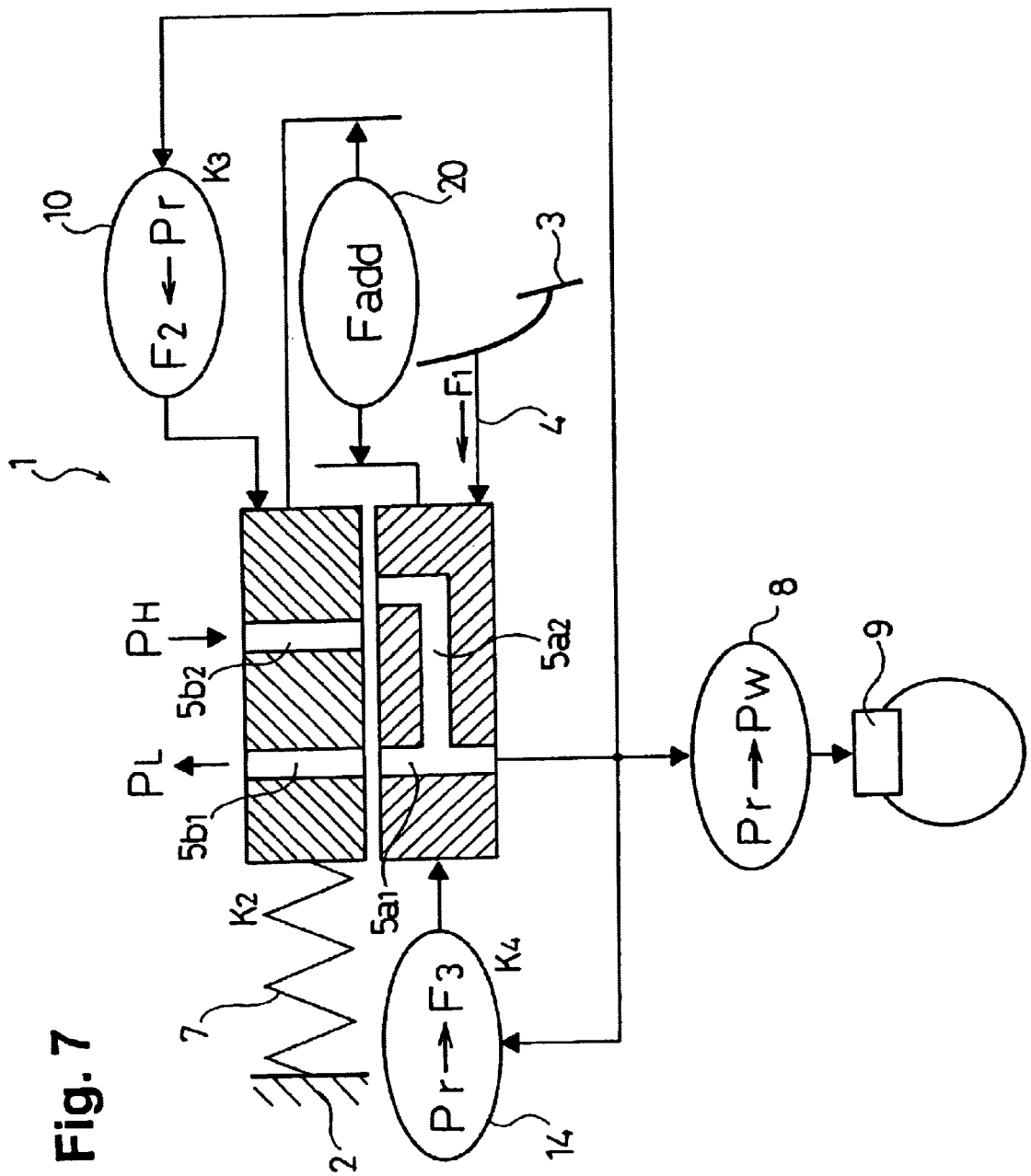
FIG. 7 is a view similar to FIG. 1 but schematically showing a brake system to which a fifth embodiment is adopted.

FIG. 7 is a view similar to FIG. 1 but schematically showing a brake system to which a fifth embodiment is adopted.

As shown in FIG. 7, the brake fluid pressure generating device 1 of the fifth embodiment is similar to the first embodiment shown in FIG. 1, but is different from the first embodiment by that the second control valve output-pressure/force converter 14 which is employed in the second embodiment shown in FIG. 2 is employed instead of the first stroke/force converter 6. In addition, an assist biasing force producing unit 20 such as a solenoid is provided which produces an assist biasing force between the first and second valve elements 5a, 5b to bias the first valve element 5a to the left and to bias the second valve element 5b to the right. By the assist biasing force producing unit 20, actuating forces can be applied to the first and second valve elements 5a, 5b regardless of the pedal input.

The other components of the brake system of the fifth embodiment are the same as those of the first embodiment.

In the brake fluid pressure generating device 1 of the fifth embodiment having the aforementioned structure, an equilibrium-of-force expression for the first valve element 5a is expressed by:

$$F_1 + F_{add} = k_4 \times P_r \tag{19}$$

Wherein $F_{add}$ is the assist biasing force by the assist biasing force producing unit 20. Since the assist biasing force $F_{add}$ is applied to the second valve element 5b, an equilibrium-of-force expression for the second valve element 5b is expressed by:

$$K_2 \times L_2 + F_{add} = k_3 \times P_r \tag{20}$$

Further, the stroke $L_1$ of the first valve element 5a is expressed by:

$$L_1 = L_2 + A = [(k_3 \times P_r - F_{add})/k_2] + A \tag{21}$$

In the second embodiment shown in FIG. 2, the control valve output pressure $P_r$ is varied due to actuation of the braking force control on the wheel cylinder 9 side, whereby the pedal stroke and the pedaling force are also changed. However, in the fifth embodiment, the assist biasing force producing unit 20 can prevent the pedal stroke and the pedaling force from being varied. That is, the assist biasing force producing unit 20 is actuated at the same time of pedaling to previously produce an assist biasing force $F_{add}$. When the control valve output pressure $P_r$ is varied due to the braking force control as mentioned, the assist biasing force $F_{add}$ is controlled to change according to the variation in the control valve output pressure $P_r$. In this manner, the pedal stroke and the pedaling force can be prevented from being varied. For example, the input $F_1$ of the input shaft i.e. the pedaling force can be prevented from being varied in the equation (19) by, when the control valve output pressure $P_r$ is increased, increasing the assist biasing force $F_{add}$ according to the increased amount of the control valve output pressure $P_r$ and by, when the control valve output pressure $P_r$ is reduced, reducing the assist biasing force $F_{add}$ according to the reduced amount of the control valve output pressure $P_r$.

The works and effects of the brake fluid pressure generating device 1 of the fifth embodiment are substantially the same as those of the aforementioned first embodiment.

Figure 8:
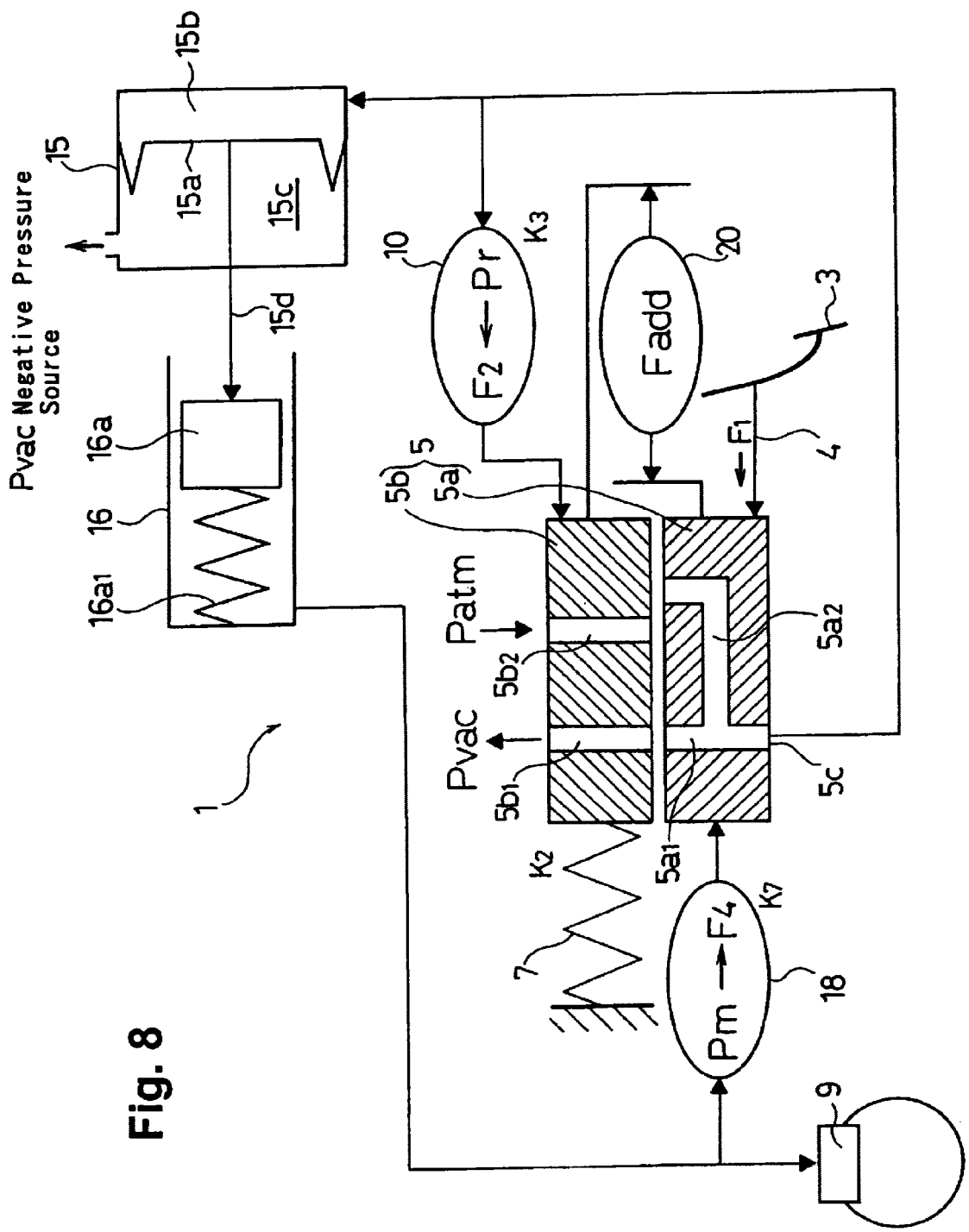
FIG. 8 is a view similar to FIG. 3 but schematically showing a brake system to which a sixth embodiment is adopted.

FIG. 8 is a view similar to FIG. 3 but schematically showing a brake system to which a sixth embodiment is adopted.

As shown in FIG. 8, a brake fluid pressure generating device 1 of the sixth embodiment is similar to the brake fluid pressure generating device 1 of the fourth embodiment which is employed in the brake system comprising the power cylinder unit 15 and the master cylinder 16 and is further provided with the assist biasing force producing unit 20 which is employed in the brake fluid pressure generating device 1 of the fifth embodiment.

The other components of the brake fluid pressure generating device 1 of the sixth embodiment are substantially the same as those of the aforementioned fourth embodiment.

In the brake fluid pressure generating device 1 of the sixth embodiment having the aforementioned structure, an equilibrium-of-force expression for the first valve element 5a is expressed by:

$$F_1 + F_{add} = k_7 \times P_m \tag{22}$$

Wherein $F_{add}$ is the assist biasing force by the assist biasing force producing unit 20. Further, an equilibrium-of-force expression for the second valve element 5b is expressed by the equation (20) just like the aforementioned fifth embodiment. Furthermore, the stroke $L_1$ of the first valve element 5a is expressed by the equation (21).

Also in the sixth embodiment, the pedal stroke and the pedaling force can be prevented from being varied even when the control valve output pressure $P_r$ or the master cylinder pressure $P_m$ is varied due to the braking force control as mentioned above by altering the assist biasing force $F_{add}$ according to the variation in the control valve output pressure $P_r$ or the master cylinder pressure $P_m$. For example, the input $F_1$ of the input shaft i.e. the pedaling force can be prevented from being varied in the equation (22) by, when the master cylinder pressure $P_m$ is increased, increasing the assist biasing force $F_{add}$ according to the increased amount of the master cylinder pressure $P_m$ and by, when the master cylinder pressure $P_m$ is reduced, reducing the assist biasing force $F_{add}$ according to the reduced amount of the master cylinder pressure $P_m$. Though there is no term for the control valve output pressure $P_r$ in the equation (22), the same as the case when the master cylinder pressure $P_m$ is increased or reduced is true for the case where the control valve output pressure $P_r$ is increased or reduced.

The works and effects of the brake fluid pressure generating device 1 of the sixth embodiment are substantially the same as those of the aforementioned fourth and fifth embodiments.

Figure 9:
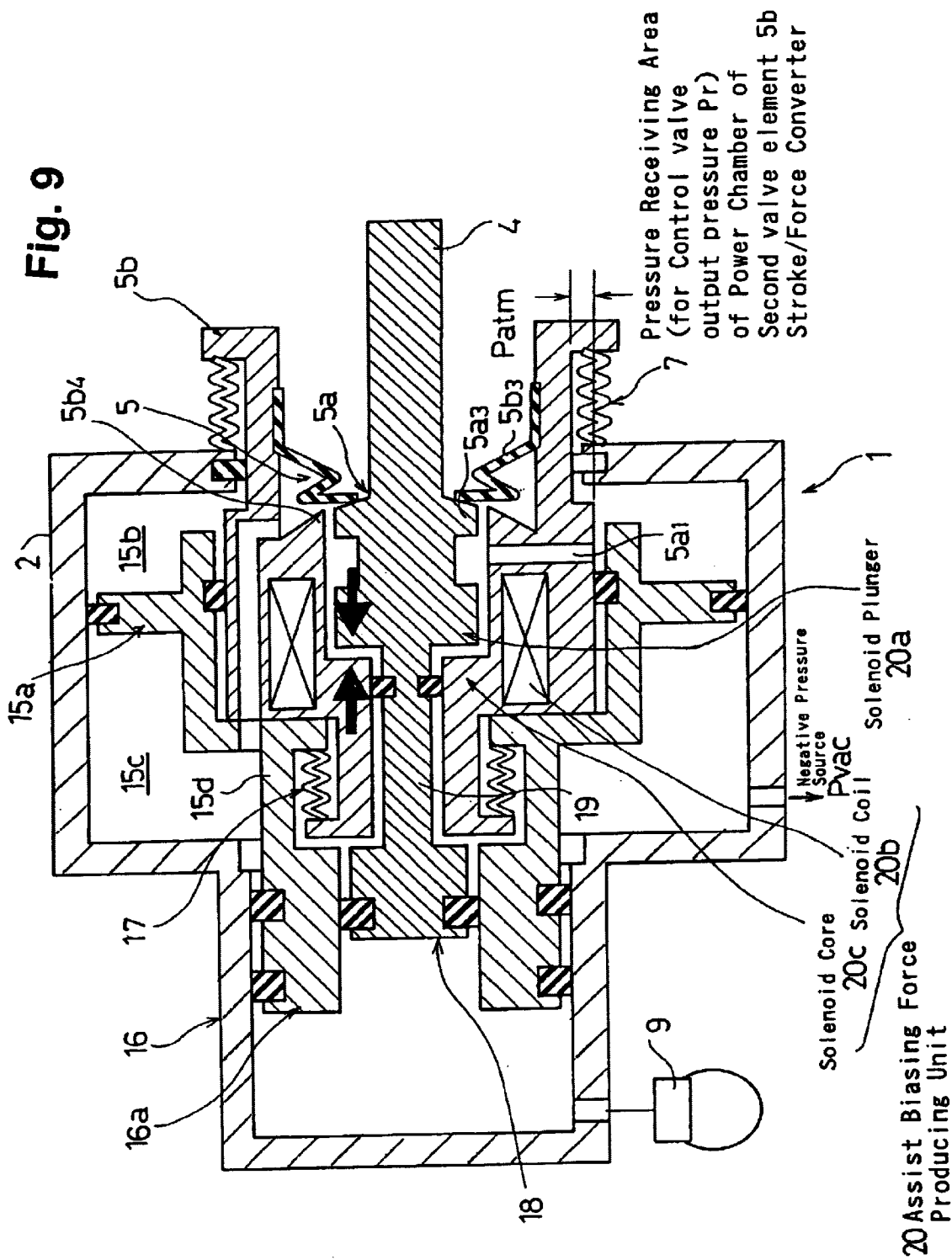
FIG. 9 is a view similar to FIG. 4 but schematically showing a third concrete example in which the brake fluid pressure generating device of the sixth embodiment shown in FIG. 8 is adopted to a brake fluid pressure generating device comprising a vacuum booster and a master cylinder.

FIG. 9 is a view similar to FIG. 4 but schematically showing a third concrete example in which the brake fluid pressure generating device 1 of the sixth embodiment shown in FIG. 8 is adopted to a brake fluid pressure generating device comprising a vacuum booster and a master cylinder.

A brake fluid pressure generating device 1 of the third concrete example is similar to the brake fluid pressure generating device 1 of the sixth embodiment shown in FIG. 8, but is different from that of the sixth embodiment by further comprising the third stroke/force converter 17 which is employed in the brake fluid pressure generating device 1 of the third embodiment shown in FIG. 3.

That is, in the third concrete example, the assist biasing force producing unit 20 is composed of a solenoid. Concretely, as shown in FIG. 9, the assist biasing force producing unit 20 comprises a solenoid plunger 20a which is formed adjacent to and integrally with the first valve element and a solenoid core 20c which is formed integrally with the second valve element 5b to surrounding the solenoid plunger 20a and has a solenoid coil 20b. By charging the solenoid coil 20c, the solenoid coil 20c generates electromagnetic forces. By the electromagnetic forces, the solenoid plunger 20a is attracted in the same direction (denoted by arrow) of the input of the input shaft 4.

The other components of the brake third pressure generating device 1 of the third concrete example are the same as those of the first concrete example shown in FIG. 4.

In the brake fluid pressure generating device 1 of the third concrete example having the aforementioned structure, an equilibrium-of-force expression for the first valve element 5a is expressed by:

$$F_1 + F_{add} = k_7 \times P_m + A_1 \times P_r \tag{23}$$

Further, an equilibrium-of-force expression for the second valve element 5b is expressed by:

$$k_2 \times L_2 + F_{add} = k_6 \times L_3 + A_2 \times P_r \tag{24}$$

Furthermore, the stroke $L_1$ of the first valve element 5a is expressed by:

$$L_1 = L_2 + A = (k_6/k_2) \times L_3 + (A_2/k_2) \times P_r - (F_{add}/k_2) + A \tag{25}$$

In the first concrete example shown in FIG. 4, the fluid consumption of the wheel cylinder 9 side is varied from that in the normal braking operation with the same pedaling force (that is, the same input $F_1$ and the same control valve output pressure $P_r$) due to the braking force control (for example, regenerative brake coordination control and/or brake assist control) on the wheel cylinder 9 side, whereby the mater cylinder pressure $P_m$ and the stroke $L_3$ of the power piston are varied so that the pedal input $F_1$ (the pedaling force) and the strokes $L_1$, $L_2$ of the first and second valve elements 5a, 5b (i.e. the pedal stroke) are also varied. That is, in the first concrete example, the pedaling force and the pedal stroke are affected by the braking force control on the wheel cylinder 9 side.

However, in the third concrete example, even when the master cylinder pressure $P_m$ and the stroke of the master cylinder (i.e. the stroke $L_3$ of the power piston) are varied due to the braking force control on the wheel cylinder 9 side, the pedal stroke and the pedaling force can be prevented from being varied, as apparent from the equations (23) and (25), by controlling the charge of the solenoid coil 20b of the assist biasing force producing unit 20 so as to control the assist biasing force $F_{add}$. For example, the pedaling force and the pedal stroke can be prevented from being varied by increasing the assist biasing force $F_{add}$ produced by the solenoid coil 20b according to the equations (23) and (25) when the master cylinder pressure $P_m$ is increased and the stroke $L_3$ of the power piston is thus also increased.

If it is designed that the solenoid coil 20b is not charged to still remain in the inoperative state even when the brake pedal is depressed and the solenoid coil 20b is charged only when the braking force control is conducted, the solenoid coil 20b acts only in a direction of increasing the assist biasing force $F_{add}$ so that it is difficult to securely correspond to the variation, i.e. increase and decrease, in the master cylinder pressure $P_m$ due to the braking force control. To solve this problem, it is designed that the solenoid coil 20b is charged to be brought in the operative state from the start of the pedaling action so as to enable to control the assist biasing force $F_{add}$ both in the increasing direction and in the decreasing direction, thereby securely corresponding to the variation, i.e. increase and decrease, in the master cylinder pressure $P_m$ due to the braking force control.

Description will be made referring to a case where during the normal braking operation conducted by depression of the brake pedal 3, the braking force control such as regenerative brake coordination control is conducted so as to produce an additional braking force. In this case, for this additional braking force, it is required to decrease the braking force produced by the master cylinder pressure $P_m$. Because the solenoid coil 20b is operated from the start of the pedaling action, the assist biasing force $F_{add}$ can be easily decreased by controlling the solenoid coil 20b. On the other hand, when the braking force control is stopped so as to cancel the additional braking force, it is required to increase the master cylinder pressure $P_m$. The assist biasing force $F_{add}$ can be easily increased by controlling the solenoid coil 20b.

As mentioned above, when the solenoid coil 20b is operated from the start of the pedaling action, master cylinder pressure is generated of which magnitude balances the reaction force produced by the master cylinder pressure/force converter 18 with the resultant of the input $F_1$ of the input shaft 4 and the electromagnetic force of the solenoid coil 20b. In this case, this master cylinder pressure is set to be equal to the master cylinder pressure generated by the same input of the input shaft 4 (i.e. the same pedaling force) in the vacuum booster 15' without the assist biasing force producing unit 20 just like the first or second concrete example shown in FIGS. 4 and 6.

The other works and effects of the brake fluid pressure generating device 1 of the third concrete example are substantially the same as those of the aforementioned first concrete example shown in FIG. 4.

Figure 10:
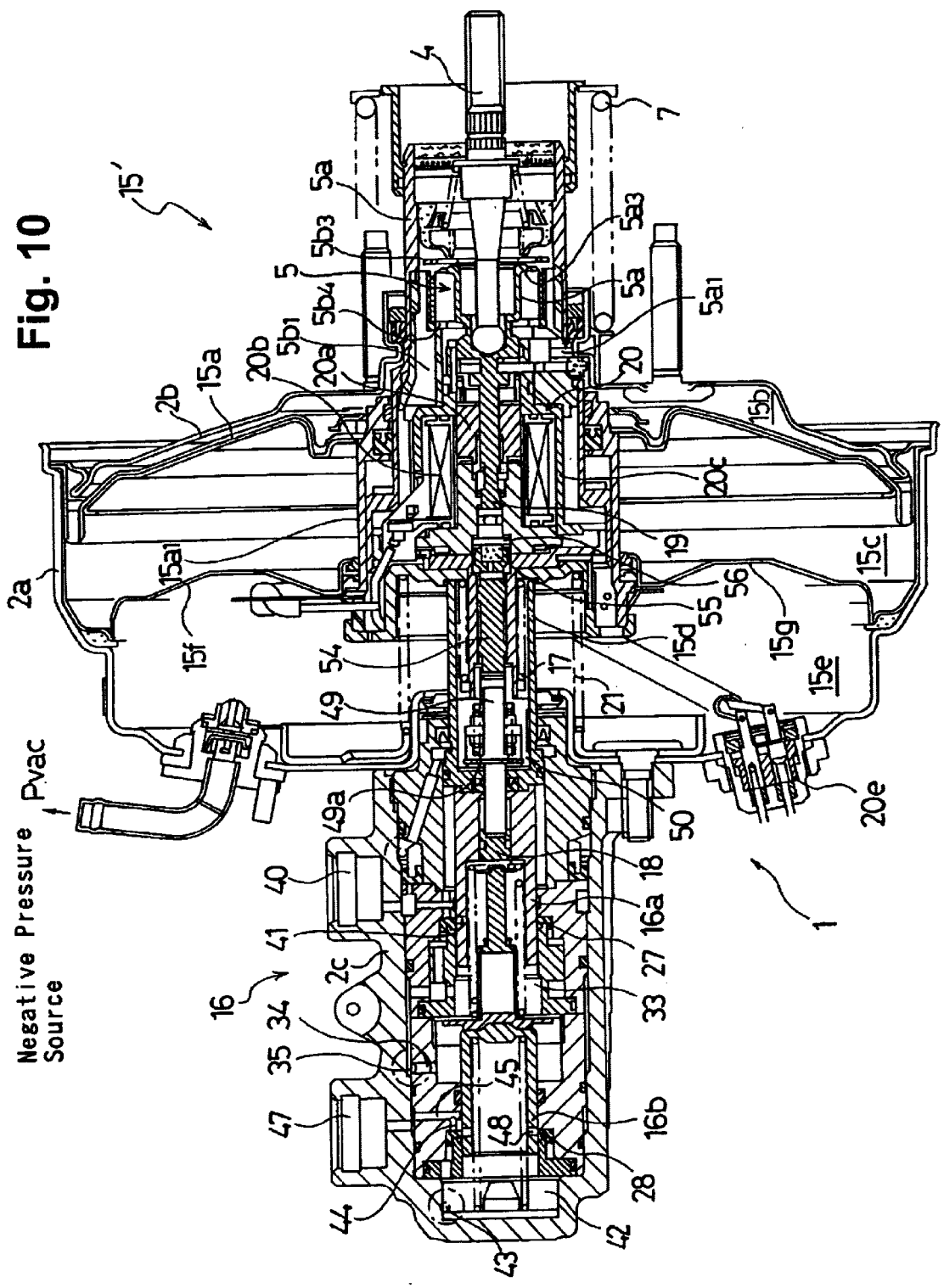
FIG. 10 is a view showing a brake fluid pressure generating device of a fourth concrete example having a vacuum booster and a master cylinder which are realized in detail more than the third concrete example shown in FIG. 9.
Figure 11:
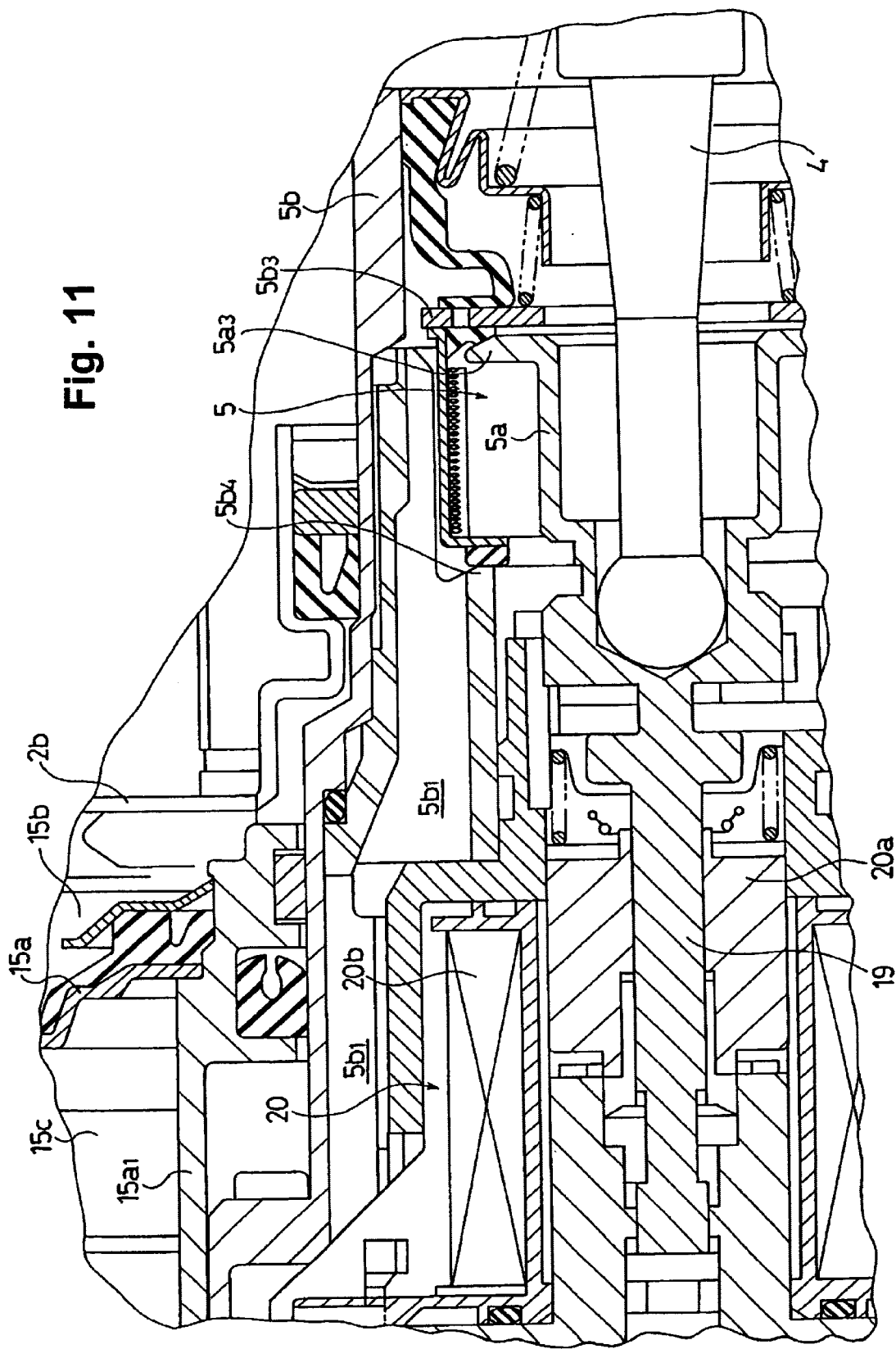
FIG. 11 is a partially enlarged view of the vacuum booster shown in FIG. 10.
Figure 12:
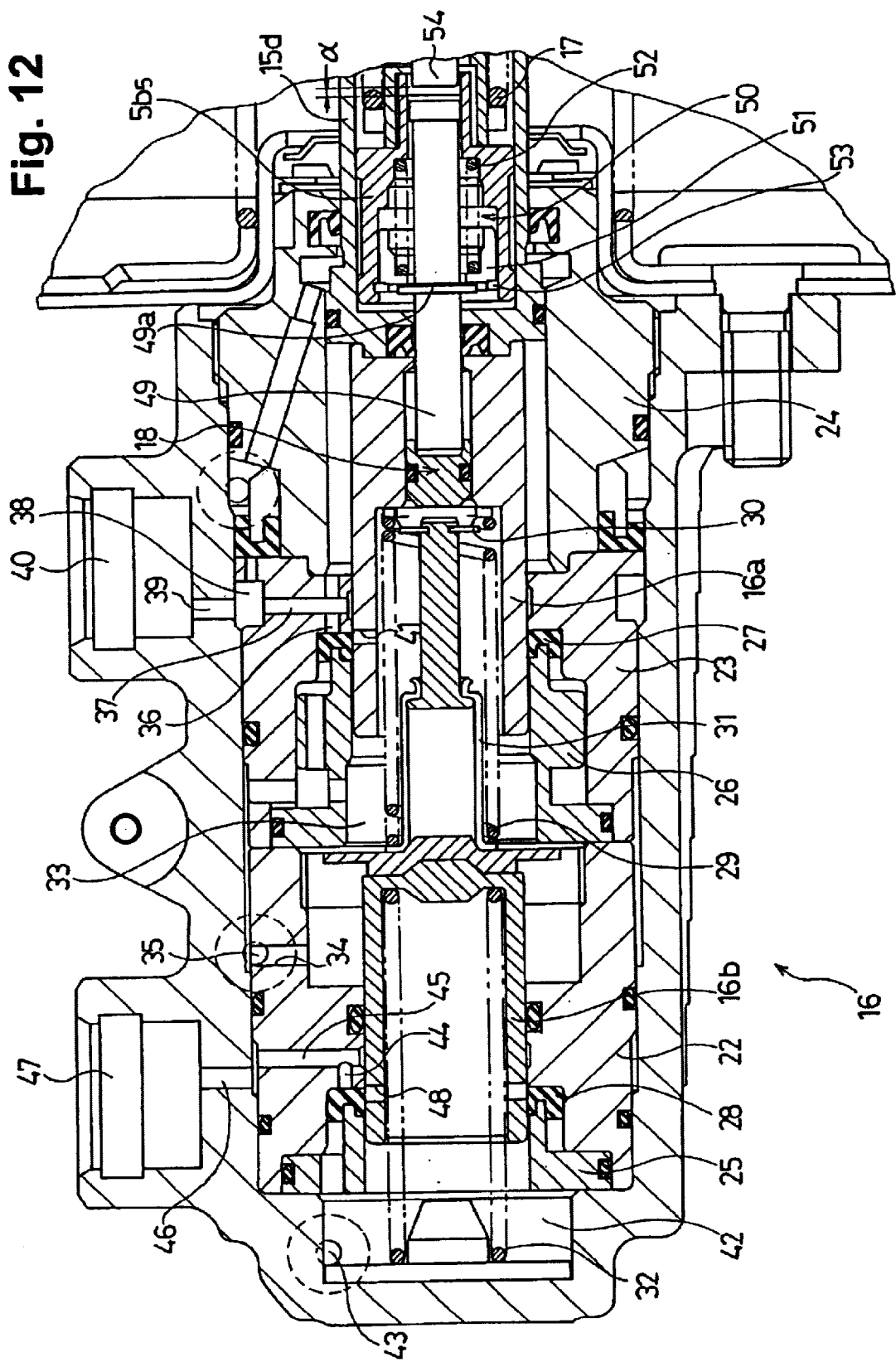
FIG. 12 is an enlarged view of the master cylinder shown in FIG. 10.
Figure 13:
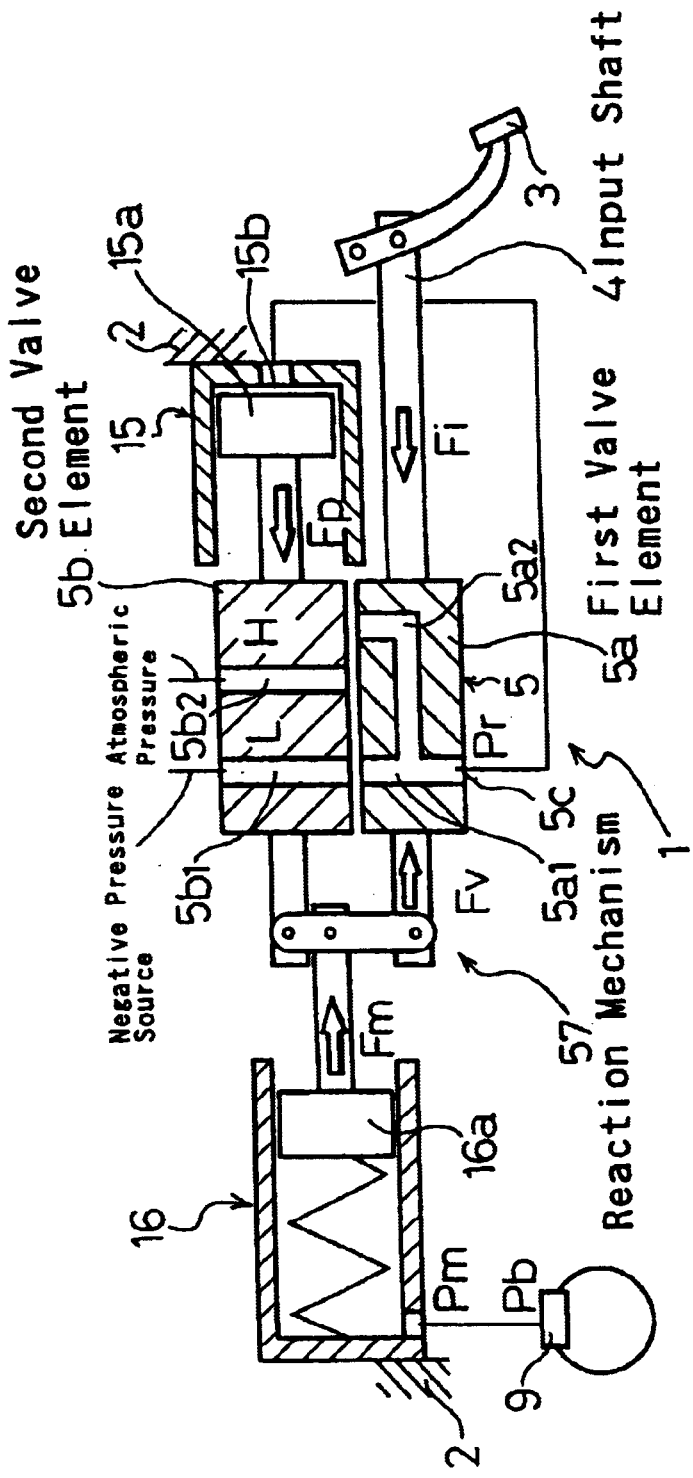
FIG. 13 is a view schematically showing an example of a brake system with a brake fluid pressure generating device employing a conventional vacuum booster.
Figure 14:
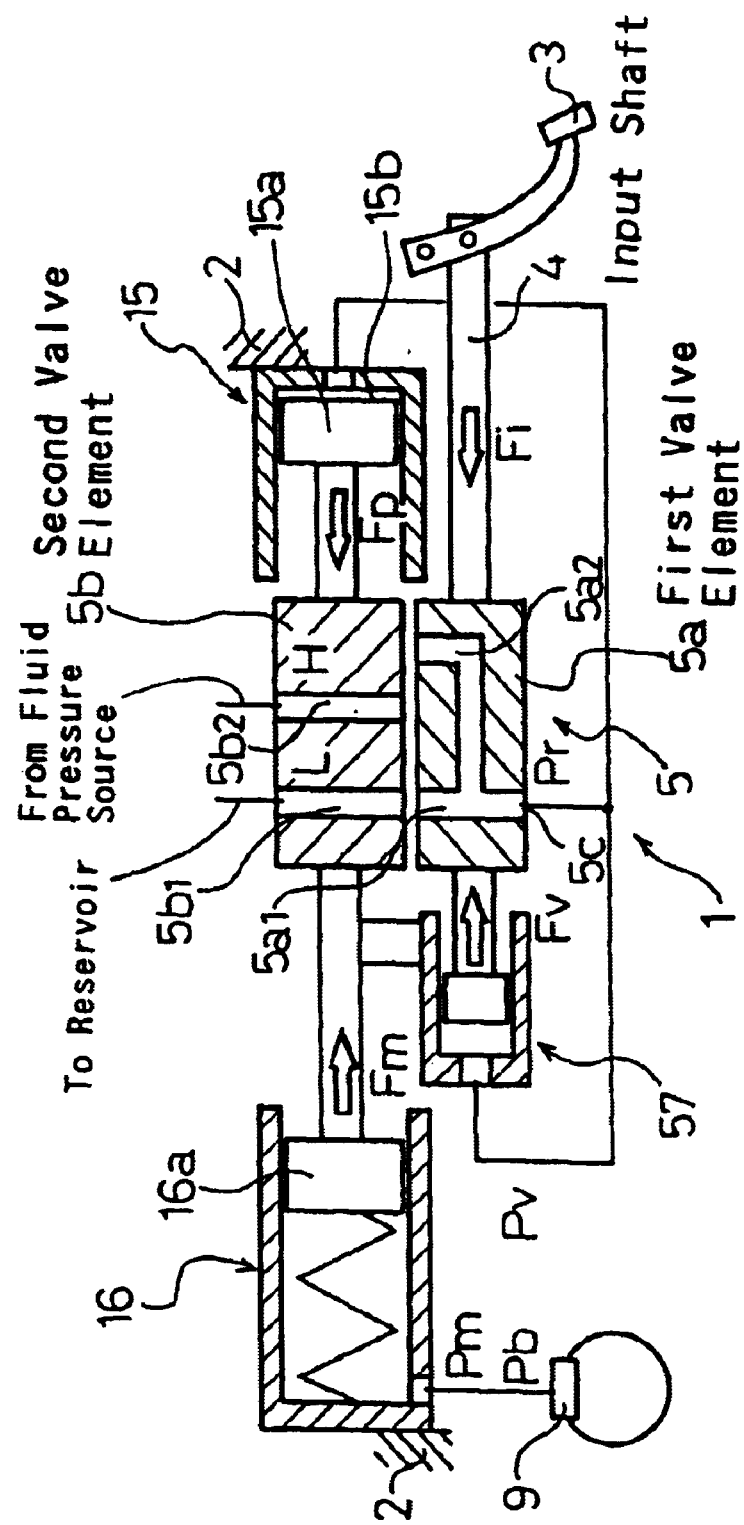
FIG. 14 is a view schematically showing a brake system employing a conventional hydraulic booster.
Figure 15:
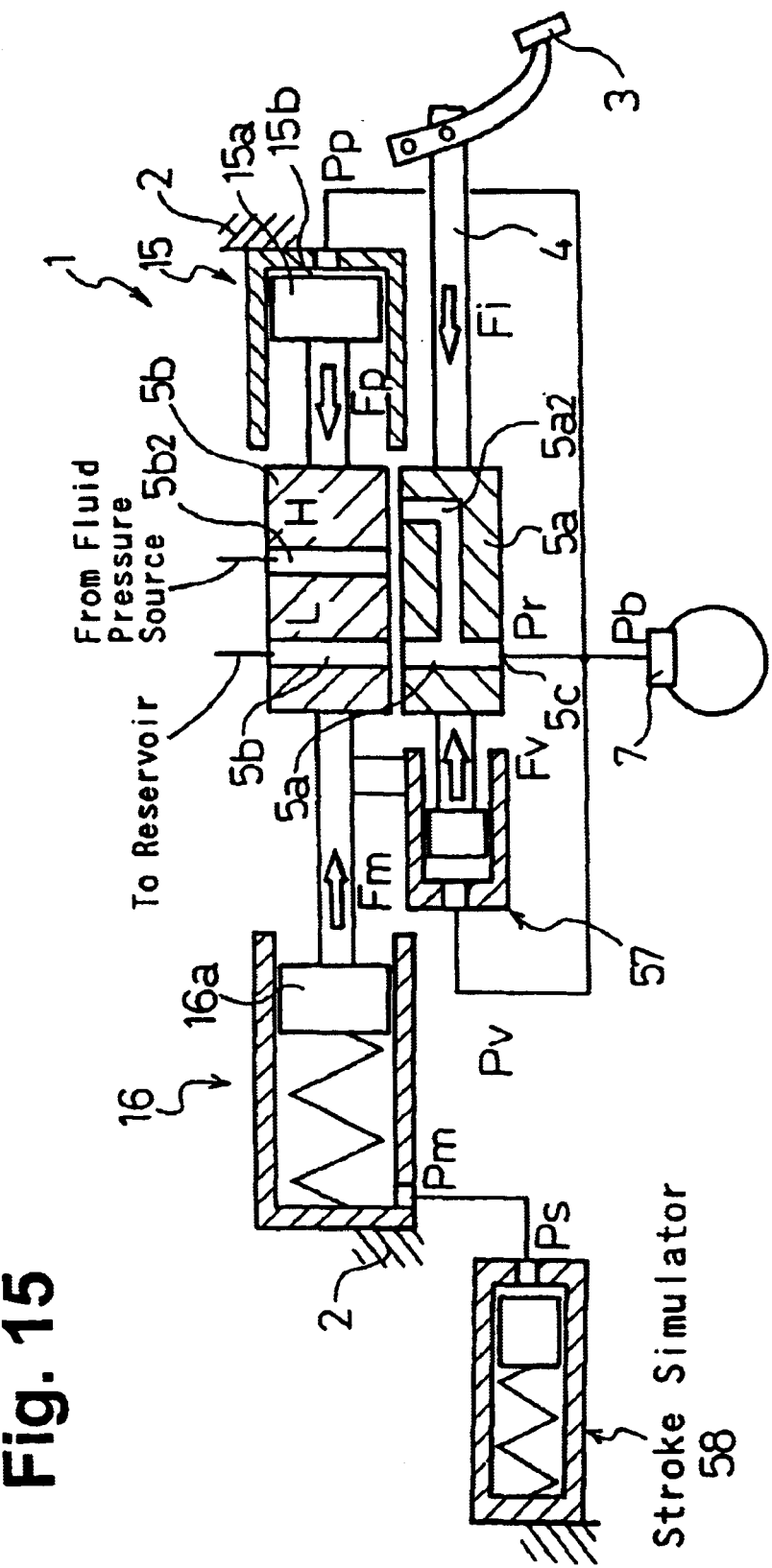
FIG. 15 is a view schematically showing a conventional full-power brake system.

FIG. 10 is a view showing a brake fluid pressure generating device 1 of a fourth concrete example having a vacuum booster 15' and a master cylinder 16 which are realized in detail more than the third concrete example shown in FIG. 9, FIG. 11 is a partially enlarged view of the vacuum booster 15' shown in FIG. 10, and FIG. 12 is an enlarged view of the master cylinder 16 shown in FIG. 10.

The brake fluid pressure generating device 1 of the fourth concrete example is a device of which the vacuum booster 15' and the master cylinder 16 are realized in detail more than those of the third concrete example shown in FIG. 9. Therefore, the vacuum booster 15' of the fourth concrete example is identical in basic structure to that of the third concrete example, so components of the basic structure corresponding to the components of the third concrete example will be marked by the same reference numerals, thereby omitting the detail description of the components. Among the other components of the vacuum booster 15' of the fourth concrete example, only components relating to the present invention will be described.

In the brake fluid pressure generating device 1 of the fourth concrete example, the housing 2 commonly used as the housing of the control valve 5 and the housing of the vacuum booster 15' is composed of shells 2a and 2b. The housing 2c of the master cylinder 16 is provided separately from the shells 2a, 2b.

The vacuum booster 15' has a negative pressure introducing chamber 15e, directly connected to the negative pressure source, inside the shells 2a, 2b. The negative pressure introducing chamber 15e is divided from the negative pressure chamber 15c by a partition 15g and always communicates with the negative pressure chamber 15c via a through hole 15f formed in the partition 15g. The partition 15g air-tightly and slidably supports a cylindrical portion $15a_1$ of the power piston 15a which pierces the partition 15g. The power piston 15a is always biased in the inoperative direction by a return spring 21. Though the return spring 21 is not shown in the first through third concrete examples, the first through third concrete examples may include the return spring 21.

Connected to the solenoid coil 20b is an electric supply line 20d. The electric supply line 20d is connected to a connector 20e which is air-tightly fitted to the shell 2a. The connector 20e may be connected to an electronic control unit (CPU) (not shown).

On the other hand, the master cylinder 16 of the fourth concrete example is a tandem type master cylinder as shown in FIG. 12. First through third cylindrical members 22, 23, 24 are fluid-tightly fitted in a stepped bore of the housing 2c in this order from the left. A fourth cylindrical member 25 is fluid-tightly fitted in the first cylindrical member 22 and a fifth cylindrical member 26 is fluid-tightly fitted in the second cylindrical member 23. By screwing the third cylindrical member 24 into the housing 2c, the first through fifth cylindrical members 22, 23, 24, 25, 26 are fixed not to move in the longitudinal direction of the housing 2c.

A cylindrical primary piston 16a (since this primary piston corresponds to the master cylinder piston 16a in the first through third concrete examples, it is denoted by the same numeral 16a in the description of the fourth concrete example) is fitted in bores of the second and fifth cylindrical members 23, 26 fluid-tightly and slidably by a first cup seal 27 disposed between the second and fifth cylindrical members 23 and 26. A cylindrical output shaft 15d is fluid-tightly and slidably fitted in the third cylindrical member 24 in such a manner that the right end of the primary piston 16a is in contact with the left end of the output shaft 15d.

A secondary piston 16b which is formed in a cylinder with a bottom is fitted in the first and fourth cylindrical members 22, 25 fluid-tightly and slidably by a second cup seal disposed between the first and fourth cylindrical members 22 and 25 and a seal supported by the first cylindrical member 22. The rear-most position of the secondary piston 16b is defined at which its right end comes in contact with the fifth cylindrical member 26.

A primary return spring 29 is disposed in the compressed state between the primary piston 16a and the secondary piston 16b via two expandable spring retainers 30 and 31 of which the maximum extension is defined. In addition a secondary spring 32 is disposed in the compressed state between the secondary piston 16b and the housing 2c.

Inside the axial bores of the first and fifth cylindrical members 22, 26, a first master cylinder pressure chamber 33 is formed between the primary piston 16a and the secondary piston 16b. The first master cylinder pressure chamber 33 is always in communication with wheel cylinder(s) 9 of a first brake circuit through a radial hole 34 formed in the first cylindrical member 22 and a first output port 35 formed in the housing 2c. The second cylindrical member 23 is formed with an axial hole 36 and a radial hole 37. The radial hole 37 always communicates with a reservoir (not shown), in which brake fluid is stored, through an annular space 38, a radial hole (passage) 39 and a first reservoir connection port 40 formed in the housing 2c. The primary piston 16a is formed with a radial hole 41 which always communicates with the first master cylinder pressure chamber 33.

On the other hand, inside the axial bores of the housing 2c and the fourth cylindrical member 25, a second master cylinder pressure chamber 42 is formed between the housing 2c and the secondary piston 16b. The second master cylinder pressure chamber 42 is always in communication with the wheel cylinder(s) 9 in a second brake circuit through a second output port 43 formed in the housing 2c. The first cylindrical member 22 is formed with an axial hole 44 and a radial hole 45. The radial hole 45 always communicates with the aforementioned reservoir through a radial hole (passage) 46 and a second reservoir connection port 47 formed in the housing 2c. The secondary piston 16b is formed with a radial hole 48 which always communicates with the second master cylinder pressure chamber 42.

In the illustrated inoperative state of the master cylinder 16 of the fourth concrete example, the radial holes 41, 48 of the primary and secondary pistons 16a, 16b are positioned behind (on the right side of) lips of the first and second cup seals 27, 28, respectively. In this state, the first master cylinder pressure chamber 33 communicates with the reservoir through the radial hole 41, a space between the back (rear surface) of the first cup seal 27 and the second cylindrical member 23, the axial hole 36, the radial hole 37, the annular space 38, the radial hole 39, and the first reservoir connection port 40, whereby the master cylinder pressure chamber 33 is at the atmospheric pressure. Further, the second master cylinder pressure chamber 42 communicates with the reservoir through the radial hole 48, a space between the back (rear surface) of the second cup seal 28 and the first cylindrical member 22, the axial hole 44, the radial hole 45, the radial hole 46, and the second reservoir connection port 47, whereby the second master cylinder pressure chamber 42 is at the atmospheric pressure.

In the operative state of the master cylinder 16, the radial holes 41, 48 of the primary and secondary pistons 16a, 16b are positioned ahead (on the left side of) of the lips of the first and second cup seals 27, 28, respectively. In this state, the radial holes 41, 48 are isolated from the axial holes 36, 44 and the radial holes 37, 45, respectively, that is, the first and second master cylinder pressure chambers 33, 42 are isolated from the reservoir, whereby master cylinder pressures $P_m$ are developed in the first and second master cylinder pressure chambers 33, 42, respectively.

The master cylinder pressure/force converter 18 composed of a reaction piston is disposed inside the primary piston 16a. The reaction piston is fluid-tightly and slidably fitted in the primary piston 16a and receives, at its left end, the master cylinder pressure to convert the master cylinder pressure into a master cylinder converted force $F_4$ as a reaction force. The right end of the reaction piston is in contact with the left end of a first reaction force transmitting rod 49 which fluid-tightly and slidably pierces the output shaft 15d to extend from the inside of the output shaft 15d to the inside of the primary piston 16a.

The right side portion of the first reaction force transmitting rod 49 is inserted into a cylindrical left end portion $5b_5$ of the second valve element 5b which is slidably fitted in the cylindrical output shaft 15d. Arranged between the cylindrical left end portion $5b_5$ of the second valve element 5b and the first reaction force transmitting rod 49 is a jumping mechanism 50. The jumping mechanism 50 comprises a spring retainer 51 slidably fitted in the cylindrical left end portion $5b_5$ of the second valve element 5b, a spring 52 disposed in the compressed state between the cylindrical left end portion $5b_5$ and the spring retainer 51, a stopper 53 for preventing the spring retainer 51 from coming off the cylindrical left end portion $5b_5$, a flange 49a which is disposed around the first reaction force transmitting rod 49 and enables to press the spring retainer 51 to the right against the biasing force of the spring 52, and a second reaction force transmitting rod 54 which is slidably fitted in the cylindrical left end portion $5b_5$ and is spaced apart from the right end of the first reaction force transmitting rod 49 by a predetermined space α. As a rightward force is applied to the first reaction force transmitting rod 49 and this force exceeds a preset load of the spring 52, the flange 49a deforms the spring 52 to move the spring retainer 51 to the right, thereby bringing the right end of the first reaction force transmitting rod 49 into contact with the second reaction transmitting rod 54. Therefore, the force of the first reaction force transmitting rod 49 can be transmitted to the second reaction force transmitting rod 54.

Disposed on the right end of the second reaction force transmitting rod 54 is a reaction disc 55 made of elastic material such as rubber. The right end of the reaction disc 55 is in contact with the left end of a spacer 56. The right end of the spacer 56 is in contact with the left end of the extension shaft 19.

The other components of the brake fluid pressure generating device 1 of the fourth concrete example are the same as those of the third concrete example shown in FIG. 9.

In the brake fluid pressure generating device 1 of the fourth concrete example having the aforementioned structure, negative pressure is always introduced into the negative pressure introducing chamber 15e and the negative pressure chamber 15c of the vacuum booster 15'. In the illustrated inoperative state, since the atmospheric pressure valve is closed and the negative pressure valve is opened as mentioned above, negative pressure is also introduced into the power chamber 15b so that the power piston 15a is in the inoperative position. In this state, the vacuum booster 15' generates no output. In addition, the primary piston 16a and the secondary piston 16b of the master cylinder 16 are also in the respective inoperative positions, the radial holes 41, 48 are on the right sides of the lips of the first and second cup seals 27, 28, respectively so that the first and second master cylinder pressure chambers 33, 42 are both at atmospheric pressure.

As the solenoid coil 20b is actuated by depression of the brake pedal 3, the first valve element 5a travels to the left by the input of the input shaft 4 and the electromagnetic force of the solenoid coil 20b, whereby the negative pressure valve is closed and the atmospheric pressure valve is opened. Then, air pressure by the atmospheric pressure is introduced into the power chamber 15b so as to actuate the power piston 15a. The power piston 15a travels to the left, whereby the vacuum booster 15' outputs through the output shaft 15d. Because of this output, the primary piston 16a travels to the left. As the radial hole 41 is moved to a position on the left side of the lip of the first cup seal 27, master cylinder pressure $P_m$ is developed in the first master cylinder pressure chamber 33 as mentioned above. Because of the master cylinder pressure $P_m$, the secondary piston 16b travels to the left. As the radial hole 48 is moved to a position on the left side of the lip of the second cup seal 28, master cylinder pressure $P_m$ is developed in the second master cylinder pressure chamber 42. Both master cylinder pressures $P_m$ are set to be equal to each other. Because of these master cylinder pressures $P_m$, brake fluid in the first and second master cylinder pressure chambers 33, 42 is supplied to the wheel cylinders 9 through the first and second output ports 35, 43, respectively.

On the other hand, the reaction piston of the master cylinder pressure/force converter 18 receives the master cylinder pressure $P_m$ from the first master cylinder pressure chamber 33 to produce a master cylinder converted force $F_4$, and transmits the master cylinder converted force $F_4$ as a reaction force to the first reaction force transmitting rod 49. Then, the first reaction force transmitting rod 49 presses the spring retainer 51 to the right against the biasing force of the spring 52 via the flange 49a. Until the master cylinder converted force $F_4$ exceeds the preset load of the spring 52, the spring 52 is not deformed so that the first reaction force transmitting rod 49 does not travel to the right and thus does not come in contact with the second reaction force transmitting rod 54. Therefore, the reaction force is not transmitted to the brake pedal 3. As the master cylinder pressure $P_m$ is increased to an extent as to finish loss stroke on the wheel cylinder 9 side, the master cylinder converted force $F_4$ is increased and the spring 52 is thus deformed, whereby the first reaction force transmitting rod 49 travels to the right to come in contact with the second reaction force transmitting rod 54. Therefore, the reaction force is transmitted to the brake pedal 3 through the second reaction force transmitting rod 54, the reaction disk 55, the spacer 56, the extension shaft 19, the first valve element 5a, and the input shaft 4. In this manner, jumping action is conducted by the jumping mechanism 50.

The other works and effects of the brake fluid pressure generating device 1 of the fourth concrete example are the same as those of the third concrete example shown in FIG. 9.

It should be noted that forces applied to the first and second valve elements 5a, 5b are not limited to the illustrative embodiments and examples, and combinations of parts of the embodiments and examples may be employed. For example, though the master cylinder pressure/force converter 18 is employed as a force to be applied to the first valve element in the third embodiment shown in FIG. 3, instead of this, the control valve converted force as employed in the second embodiment shown in FIG. 2 may be employed. It should be understood that various combinations can be made other than this.

Moreover, though the vacuum booster 15' is employed as the power cylinder unit 15 in the first through fourth concrete examples, other power cylinder units 15 such as a hydraulic booster may be employed as the power cylinder unit 15 of the present invention.

As apparent from the above description, according to the brake fluid pressure generating device of the present invention, the input side and the output side are separated from each other, whereby stroke of a brake operating means can be prevented from being varied even when braking pressure control is conducted in a brake circuit on the brake cylinder side after a control valve independently of the input of the input side during normal braking operation so that the consumption of brake fluid is varied.

The device can provide desired stroke characteristic of the brake operating means without being affected by variation in consumption of brake fluid on the output side of the brake fluid pressure generating device.

Further, the device allows the braking force control in the brake circuit on the brake cylinder side after the control valve to be conducted independently of the input of the input side during normal braking operation. Therefore, the brake fluid pressure generating device of the present invention can be easily and flexibly adopted to a system which needs the control of braking pressure $P_w$, for example, decreasing the braking pressure $P_w$ for regenerative brake coordination control of a regenerative brake coordination system and increasing the braking pressure $P_w$ for brake assist control of a brake assist system, independently of the operation of the brake operating means during operation of the brake fluid pressure generating device.

What we claim is:

1. A brake fluid pressure generating device, comprising:
   an input shaft to be actuated by brake operating means,
   a first valve element connected to the input shaft to be operated by a force applied to the input shaft,
   first force means connected to the first valve element to provide a counter force relative to the force applied to the first valve element so that the first valve element is balanced between the counter force and the force of the input shaft,
   a second valve element situated adjacent to the first valve element to be able to move relative to the first valve element,
   a power cylinder unit actuated by the first valve element and having a power piston moved according to an operation of the first valve element,
   second force means situated between the power piston and the second valve element to move the second valve element with a force in association with a movement of the first valve element, said force of the second force means being converted by a converting factor with respect to a stroke of the power piston,
   third force means connected to the second valve element to provide a counter force relative to a force applied to the second valve element by the second force means, said counter force of the third force means being converted by a converting factor with respect to a stroke of the second valve element so that the second valve element is balanced between the force of the second force means and the counter force of the third force means, and
   a master cylinder connected to the power piston to generate a master cylinder pressure to thereby output a regulated control valve output pressure.

2. A brake fluid pressure generating device as claimed in claim 1, wherein said first force means attached to the first valve element provides a master cylinder converted force produced by the master cylinder pressure and converted by a converting factor.

3. A brake fluid pressure generating device as claimed in claim 1, further comprising assist biasing force means for shifting said first valve element relative to said second valve element between said first and second valve elements, said first valve element being controlled to balance said input, said first force means, and said assist biasing force means, and said second valve element being controlled to balance said second force means, said third force means, and said assist biasing force means so that the control valve output pressure regulated according to an operational input of said brake operating means is generated.

4. A brake fluid pressure generating device as claimed in claim 3, wherein said assist biasing force means is a solenoid coil to generate an electromagnetic force.

5. A brake fluid pressure generating device as claimed in claim 1, wherein the input of said input shaft applied to said first valve element is a component of a force corresponding to an operational input of said brake operating means which is produced by distributing a force according to a distribution factor.

* * * * *

UNITED STATES PATENT AND TRADEMARK OFFICE
CERTIFICATE OF CORRECTION

PATENT NO.   : 6,652,040 B2
DATED        : November 25, 2003
INVENTOR(S)  : Oka et al.

It is certified that error appears in the above-identified patent and that said Letters Patent is hereby corrected as shown below:

Title page,
Item [75], Inventors, should read: -- Hiroyuki Oka, Higashimatsuyama (JP); Yoshiyasu Takasaki, Higashimatsuyama (JP) Mamoru Sawada, Kariya (JP); Kazuya Maki (JP) --

Signed and Sealed this

Twenty-second Day of March, 2005

JON W. DUDAS
*Director of the United States Patent and Trademark Office*